US005597518A

United States Patent [19]

Lovoi

[11] Patent Number: 5,597,518

[45] Date of Patent: Jan. 28, 1997

[54] METHOD FOR PRODUCING SELF SUPPORTING FLAT VIDEO DISPLAY

[75] Inventor: Paul A. Lovoi, Saratoga, Calif.

[73] Assignee: Silicon Video Corporation, San Jose, Calif.

[21] Appl. No.: 333,450

[22] Filed: Nov. 2, 1994

Related U.S. Application Data

[62] Division of Ser. No. 867,044, Apr. 10, 1992, Pat. No. 5,424,605.

[51] Int. Cl.$^6$ .......... B29D 11/00

[52] U.S. Cl. .......... 264/1.21; 264/60; 264/430

[58] Field of Search .......... 264/1.21, 1.36, 264/22, 60, 61, 62, 245, 259, 430

[56] References Cited

U.S. PATENT DOCUMENTS

| | | | |
|---|---|---|---|
| 3,237,039 | 2/1966 | Fyler . | |
| 3,303,374 | 2/1967 | Fyler . | |
| 3,330,707 | 7/1967 | Reed . | |
| 3,566,187 | 2/1971 | DuBois, Jr. . | |
| 3,612,944 | 10/1971 | Requa . | |
| 3,622,828 | 11/1971 | Zinn | 313/103 |
| 3,753,022 | 8/1973 | Fraser, Jr. | 313/78 |
| 3,755,704 | 8/1973 | Spindt et al. | 313/309 |
| 3,789,471 | 2/1974 | Spindt et al. | 29/25.17 |
| 3,855,499 | 12/1974 | Yamada et al. | 315/169 R |
| 3,935,499 | 1/1976 | Oess | 313/413 |
| 3,956,667 | 5/1976 | Veith | 315/169 TV |
| 4,020,381 | 4/1977 | Oess et al. | 313/302 |
| 4,075,535 | 2/1978 | Genequand et al. | 313/422 |
| 4,088,920 | 5/1978 | Siekanowicz et al. | 313/422 |
| 4,227,117 | 10/1980 | Watanabe et al. | 315/13 R |
| 4,243,986 | 1/1981 | Nixon | 340/756 |
| 4,341,980 | 7/1982 | Noguchi et al. | 315/169.1 |
| 4,435,672 | 3/1984 | Heynisch | 315/366 |
| 4,451,759 | 5/1984 | Heynisch | 313/395 |
| 4,531,122 | 7/1985 | Redfield | 340/781 |
| 4,564,790 | 1/1986 | Veith | 315/169.4 |
| 4,618,801 | 10/1986 | Kakino | 313/495 |
| 4,677,259 | 6/1987 | Abe | 178/18 |
| 4,719,388 | 1/1988 | Oess | 315/169.1 |
| 4,728,851 | 3/1988 | Lambe | 313/309 |
| 4,820,661 | 4/1989 | Nair | 501/79 |
| 4,857,799 | 8/1989 | Spindt et al. | 313/495 |
| 4,867,935 | 9/1989 | Morrison, Jr. | 264/61 |
| 4,874,981 | 10/1989 | Spindt | 313/309 |
| 4,884,010 | 11/1989 | Biberian | 315/366 |
| 4,900,981 | 2/1990 | Yamazaki et al. | 313/422 |
| 4,904,895 | 2/1990 | Tsukamoto et al. | 313/336 |
| 4,908,539 | 3/1990 | Meyer | 315/169.3 |
| 4,940,916 | 7/1990 | Borel et al. | 313/306 |
| 4,948,759 | 8/1990 | Nair | 501/17 |
| 4,954,744 | 9/1990 | Suzuki et al. | 313/336 |
| 4,956,574 | 9/1990 | Kane | 313/306 |
| 4,964,946 | 10/1990 | Gray et al. | 156/643 |
| 4,974,942 | 12/1990 | Gross et al. | 359/54 |
| 4,978,952 | 12/1990 | Irwin | 345/102 |
| 4,994,708 | 2/1991 | Shimizu et al. | 313/306 |
| 5,015,912 | 5/1991 | Spindt et al. | 313/495 |
| 5,053,673 | 10/1991 | Tomii et al. | 313/308 |
| 5,057,047 | 10/1991 | Greene et al. | 445/24 |
| 5,070,282 | 12/1991 | Epsztein | 315/383 |
| 5,130,614 | 7/1992 | Staelin | 315/366 |
| 5,227,691 | 7/1993 | Murai et al. | 313/422 |
| 5,229,691 | 7/1993 | Shichao et al. | 315/366 |

OTHER PUBLICATIONS

Betsui, "Fabrication And Characteristics of Si Field Emitter Arrays", *Technical Digest of IVMC 91*, 1991, pp. 26–29.

(List continued on next page.)

*Primary Examiner*—Christopher A. Fiorilla
*Attorney, Agent, or Firm*—Skjerven, Morrill, MacPherson, Franklin & Friel; Alan H. MacPherson; Ronald J. Meetin

[57] ABSTRACT

A face plate for a cathode ray tube display is produced by a method in which small holes are formed through a sheet of unfired ceramic tape. The holes are arranged in a desired pattern for the location of pixel dots. The holes are filled with generally transparent glass to form plugs in the desired pattern. The ceramic tape is cured to a hardened state by firing to an appropriate temperature. Each plug is coated at an inner, anode side of the face plate with phosphor of appropriate color.

5 Claims, 27 Drawing Sheets

OTHER PUBLICATIONS

Blodgett, "Surface Conductivity of Lead Silicate Glass after Hydrogen Treatment", *Journal of the American Ceramic Society*, vol. 34, No. 1, 1951, pp. 14–27.

Brodie et al. "Vacuum Microelectronics", *Advances In Electronics And Electron Physics*, vol. 83, 1992, pp. 1–106.

Brodie, "Advanced Technology: Flat Cold–Cathode CRTs", Information Display, vol. 5, No. 1, Jan. 1989, pp. 17–19.

DuPont Electronics, "Green Tape Systems", Data Sheets, 1988, 1991, (4 pages).

Goede, "Digital Address Thin Display Tube", Northrop Corp. /NTIS, Nov. 1974, pp. 1–134.

Goede, "A Digitally Addressed Flat–Panel CRT", *IEEE Transactions on Electron Devices*, vol. ED–20, No. 11, Nov. 1973, pp. 1052–1061.

Jaitly et al., "In–situ Insulator Surface Charge Measurements in Dielectric Bridged Vacuum Gaps Using an Electrostatic Probe", *IEEE Transactions on Electrical Insulation*, vol. 23, No. 2, Apr. 1988, pp. 261–273.

Kaneko et al., "Field Emitter Array With Lateral Wedges", *Technical Digest of IVMC* 91, 1991, pp. 50–51.

Levy et al., "Phosphors For Full–Color Microtips Fluorescent Displays", *International Display Research Conference*, 1991, pp. 20–23.

Meyer, "6"Diagonal Microtips Fluorescent Display For T.V. Applications", *EuroDisplay* '90 *Digest*, Sep. 1990, (4 pages).

Peterson, "Low Voltage (~300 V) Cathodoluminescence of Common CRT Phosphors", The Electrochemical Society Spring Meeting, vol. 80–1, Abstract No. 201, May 1980, pp. 528–531.

Reed, "Heat Treatment Studies on High Alumina Ceramics", from Slater, *Advances in Electron Tube Techniques*, The MacMillan Company, New York, 1963, pp. 15–29.

Spindt et al., "Physical Properties of Thin–Film Field–Emission Cathodes with Molybdenum Cones", *Journal of Applied Physics*, vol. 47, No. 12, Dec. 1976, pp. 5248–5263.

Spindt et al., "Field Emission Array Development", 33rd International Field Emission Symposium, Fritz–Haber Institut, Berlin, 1986, pp. 1–11.

Takahashi et al. "Back Modulation Type Flat CRT", Japan Display '92, 1992, pp. 377–380.

Tannas, Jr., "Flat–Panel Displays and CRTs",1985, pp. 218–219, 231–232, 360, 400, 403.

90
18
92
94
96
96a
96b
96c
98
90x
90a
90b
90c
90d
90e
44

METHOD FOR PRODUCING SELF SUPPORTING FLAT VIDEO DISPLAY

This application is a division of application Ser. No. 07/867,044, filed Apr. 10, 1992, now U.S. Pat. No. 5,424, 605.

BACKGROUND OF THE INVENTION

The invention is concerned with flat screen displays, and in particular the invention relates to a flat, thin cathode ray tube structure which utilizes a flat, generally uniform array of electrons, passed selectively through an addressing grid to address pixels on an electron-excitable coated face plate. This is in contrast to a scanned ray of electrons as in conventional CRTs.

Flat screen video displays have been known in concept and have been a common goal in the video/television industry for some years. For examples of this and related technology, see U.S. Pat. Nos. 3,566,187, 3,612,944, 3,622, 828, 3,956,667, 4,088,920, 4,227,117, 4,341,980, 4,435,672, 4,531,122, 4,564,790 and 4,719,388. Such flat screen display structures have been intended to eliminate the very deep profile of televisions and other CRT displays, required because of the electron scanning gun which must be a certain proportionate distance behind the phosphor coated face plate, this distance increasing with screen size. Other goals of flat screen television have been reduction of weight, avoiding the requirement of high voltage for larger screens, truly flat face plates, and reduced cost of manufacture.

Numerous alternative thin, flat screen technologies have been developed which are either currently used in display applications or show distinct promise for such applications. These applications typically require low power, require light weight and/or small size (characteristics provided in varying degrees by these flat screen displays) and do not require the video speeds, full color, high screen resolution, or other features that can currently only be accomplished by conventional cathode ray tube displays. Hence, although many new applications have developed for flat screen technologies, these technologies have not significantly penetrated the existing large applications for CRTs, such as television and desktop computer.

For example: the conventional twisted pneumatic and supertwist liquid crystal displays ("LCDs") have very low power and cost in monochrome modes, but do not have sufficient speed, gray shades, uniformity, power efficiency and resolution to be used in television and many computer applications, which require full color and video rates. More advanced LCD technologies have also been produced, such as ferroelectric LCDs which switch at video speeds. However, this technology still has significant gray scale, manufacturing, reliability and life problems which must be overcome before it can be used in full color and video display applications.

Another advanced LCD technology, active matrix LCDS, uses thin film transistors or diodes at the location of each picture element to switch the liquid crystal material at video speeds and achieve very high resolutions without losing contrast. Although this technology has the potential to be used in full color and video display applications, it is very difficult (i.e. expensive) to manufacture. The thin film circuits at each pixel are a few microns in size, and must be made with submicron registrations between the thin film layers over 8" or more of a glass substrate. This glass substrate expands and contracts nonuniformly during manufacturing processing (among other significant manufacturing problems).

Thin film electroluminescent, TFEL, displays can display information at video rates and potentially can be made in large sizes. However, they are relatively power inefficient because electron to light conversion efficiencies are very low for color TFEL phosphors and because the capacitive loading from the thin film electrode/dielectric structures is relatively high. TFEL displays are expensive to produce because the higher voltage and current requirements necessitate expensive drive circuits, and also because the thin films must be pinhole free over the entire display area to avoid shorts in addressing electrodes.

Plasma and vacuum fluorescent displays have been produced with video rate speeds and color, but these also remain relatively power inefficient and expensive due to manufacturing difficulties and expensive drive electronics.

One of the most promising approaches for duplicating the full color, wide viewing angle, high power efficiencies, high resolution, large areas and high brightness characteristics of the CRT is to develop a "flat CRT". Numerous flat CRT technologies have been developed to various degrees, but all have been too expensive for TV and other large volume display applications and have not been scalable to large sizes. One flat CRT approach uses conventional electron beam scanning, but magnetically folds or bends the electron beam so that the resulting tube can be relatively thin. This approach has worked for small displays, but suffers significant image distortion and resolution loss when scaled up to sizes much beyond three inch diagonal screens.

Another flat CRT approach involves the use of micron sized field emitters which can emit electrons into vacuum without the heating required in conventional thermionic cathodes. This has the potential of providing a very efficient and thin flat CRT. However, addressing of the individual emitters is difficult.

Also, there remain other significant manufacturing, reliability and uniformity problems yet to be resolved before flat CRTs using field emission cathodes can be manufactured in volume and at realistic cost.

Most of the remaining flat CRT approaches have used one or multiple grid structures to switch on and off a matrix of micro electron beams. These beams originate ideally from a planar source of electrons (emitted from a distributed set of cathodes) on one side of the grid structure and are accelerated forward on the other side of the grid toward phosphors on an anode plate, which is maintained at a high voltage potential. Although prototype monochrome and color displays using this general approach have been produced, the fabrication costs, assembly difficulties and/or performance characteristics of the grids were major reasons why each such prototype failed to meet its commercial cost and performance targets.

A number of the above-listed patents were concerned with flat screen cathode ray tubes. These have generally not functioned as desired and sometimes not precisely as explained theoretically in the patents, and many of them have been too costly to achieve with the required level of reliability. Yields can be very low. Some of the patented arrangements were based on incorrect premises as to behavior of electrons presented behind an addressing grid in a supposed uniform planar array for availability in exciting pixels with desired resolution and at prescribed brightness. No flat screen cathode ray tube described in the referenced patents has yet reached commercial significance.

The addressing grid structure is a problem for which adequate solutions have not yet been presented by any of the flat screen CRTs described in the prior art. In order for an addressing structure to efficiently and reliably address individual pixels, without any dead spots on the entire screen, there must be an efficient means of placing the appropriate positive electrical charge at individual addressing points so as to accelerate electrons toward the prescribed pixels, without an inordinate volume of wiring or a complex maze of conductive traces or printed circuit patterns. Proposals for high definition television have included displays with up to 1152 rows and with up to 2048 columns, i.e. more than two million pixels in the display. A 14-inch diagonal HDTV display (following a prevailing view of a 9:16 aspect ratio) is 6.86 inches high. The color triads in such a display are only 6.0 mils apart. This presents real problems as to the dimensions of any wire grid addressing structure. If wires were to be used, extending in free space, they would have to be of sufficiently small dimension to leave adequately sized openings such that an appreciable number of electrons can be admitted through the grid to the pixels, as compared to the number of electrons which will flow into the grid itself as current.

Another consideration in the design of a flat screen CRT video display is support for the glass, phosphor coated (anode) face plate under the near-perfect vacuum which must exist inside the CRT. Thick, arched glass must be avoided. Previously suggested flat screen CRT structures simply have not addressed this issue with any practical and cost-efficient structure. At the rear of the flat screen CRT, the same issue exists with respect to the support of a rear plate which closes the back of the display.

Further considerations with the development of an efficient, dependable, cost effective flat screen CRT having adequate brightness capability and reasonable longevity include producing a reliable source of electrons, uniformly distributed, for use in addressing the display tube pixels; and sealing a flat screen structure reliably to retain the high vacuum while bringing a multiplicity of conductive paths to the exterior of the flat picture tube for inputting the addressing signal to the addressing grid and for other purposes. "Hot" or thermionic cathodes have been the usual suggested means for achieving the desired electron cloud, as in U.S. Pat. Nos. 4,719,388, 4,435,672 and 3,566,187 referenced above. "Cold" cathodes have been suggested in various configurations but as yet have not proven to be cost-efficient, effective and reliable for use in repeatedly addressing the very large number of pixels in a video display, particularly in a high definition display. Examples of attempts at a cold cathode are the efforts of LETI (France) and Coloray Corporation of Fremont, Calif. to achieve a cold cathode for a flat screen display using microtip technology. One problem has been that the microtips are not sufficiently uniform from tip to tip to achieve predictable pixel activation if each tip is relied upon. Thus, a group of hundreds of microtips has been used to supply electrons for one pixel dot on the screen. The approach attempts to apply integrated circuit technology to full screen dimensions, requiring wiring to active transistors over a large area and leading to other problems as well. Further, ion milling problems from backflow of ions require the use of low voltage phosphors, which are of lower efficiency than high voltage phosphors and cannot be aluminized, thus further reducing their efficiency due to loss of rearward directed photons.

A disclosure of an addressing grid structure was published by Northrop Corporation in 1974, entitled "Digital Address Thin Display Tube", by Walter F. Goede, distributed by National Technical Information Service (U. S. Department of Commerce). The disclosure describes a fritted together stack of glass plates having conductive strips deposited on the glass plates and a multiplicity of holes through the plates. Low temperature glass was used, so that the plates could be fused together in the fritting process at relatively low temperature. However, the Northrop disclosure involves pure amorphous glass plates, assembled in a rigid state, rather than unfired ceramic or glass/ceramic layers or other initially flexible sheet material. The amorphous glass plates are weak as compared to glass ceramic plates. Further, the fritted stack of glass plates was to be placed inside a vacuum tube, rather than sealing directly to the stack of plates and rather than being self-supporting against the face plate as in the present invention. The thick addressing grid would make electron transmission difficult and efficiency low. Further, hole forming/trace printing sequences as explained below relative to the present invention could not have been used, and the density of holes was limited. The Northrop structure differed markedly from the present invention in these and other respects.

See also "A Digitally Addressed Flat-Panel CRT", by W. F. Goede, *EEE Transactions on Electron Devices,* Vol. Ed-20, No. 11, November 1973, disclosing a multiple-plate addressing structure and encoding techniques.

Other work with flat-screen CRT displays has been done by Texas Instruments and by Source Technology. The Texas Instruments' work involved a grid of conductive ribbons formed by a photo etching process, each ribbon coated by a glass frit. The ribbons were overlaid in a grid and the assembly was heated to fuse the glass coated ribbons together. This produced a very fragile grid assembly, and one wherein shorts would frequently occur at the conductive ribbon crossovers due to nonuniformity in the glass layers. Yields were extremely low, so low as to not be economical in manufacture.

The work done by Source Technology involved leads on a substrate having only a top and a bottom surface. The hermetic seal for the assembly was made directly over the leads. Source Technology's substrate was a Photoceram (a trademark of Corning) sheet, with etched holes and deposited conductive traces formed by a solid sheet of conductor which was then divided by lasercutting. Addressing density of the grid holes was not adequate for most of today's applications.

The following table lists features of different previous approaches as outlined above, in comparison with the system of the present invention.

TABLE I

| | A | B | C | PRESENT INVENTION |
|---|---|---|---|---|
| Grid Substrate: | | | | |
| Flexibility during Initial Manufacturing | moderate | poor | poor | excellent |
| Handleability after Fabricat. | poor | excellent | moderate | excellent |
| Integral Supports for Enclosure Possible | no | no | no | yes |
| Ease of Hole Formation | poor | poor | excellent | excellent |
| Ease of Trace Formation | poor | excellent | poor | excellent |
| Material Compatilibity: | | | | |

TABLE I-continued

| | A | B | C | PRESENT INVEN-TION |
|---|---|---|---|---|
| Cathode Poisoning | good | good | poor | good |
| Vacuum outgassing | poor | moderate | excellent | excellent |
| Functionality: | | | | |
| Hermetic Leadout Integral with Grid | no | no | yes | yes |
| Encoding Possible | yes | yes | no | yes |
| Ability to Mount chips Directly on Grid | no | no | moderate | excellent |

A: Glass frit coated conductive ribbons
B: Fritted glass plates
C: Single sheet photochemically active glass Previously described flat screen displays failed to provide or suggest an efficient, manufacturable, high-yield, cost-effective and reliable system for a flat screen video display tube, as in the present invention described below.

SUMMARY OF THE INVENTION

In accordance with the present invention, a thin, flat screen CRT display has a construction based on a series of low-temperature glass ceramic (or other preliminarily flexible) layers which are extremely versatile in permitting much of the CRT assembly in the flexible state. The construction enables efficient placement of conductive traces using hybrid circuit technology, vacuum compatibility, encoding to reduce leads and drivers, self-support of the assembly at the face plate and back plate, placement of virtually all electronic components on a single "board", efficient sealability of the laminated assembly, and a very low, flat assembly profile. In addition, the assembly achieves low cost and high strength.

The characterization of the display as "flat" is not intended to limit the construction to non-curved flat displays, but instead connotes a screen which is not bowed convexly relative to the CRT for strength, and wherein the CRT is thin. By "thin" it is meant, in general, that the tube is preferably uniform in thickness and without the rear bulge present with electron gun tubes; and of considerably less depth than that of an electron gun tube. In preferred embodiments a thin CRT of the invention is very thin, on the order of less than one inch in thickness, regardless of screen size.

The addressing grid structure of the invention can be used for other applications involving manipulations or excitations of charged particles at selected locations within a grid.

An addressing grid structure of the CRT preferably is formed of laminated sheets of vacuum/electron beam compatible low temperature glass ceramic material, with conductive metal traces on surfaces of layers, deposited prior to lamination. In one preferred embodiment the addressing grid laminate has an overall thickness of about 0.032 inch. A multiplicity of holes through the glass ceramic layers, approximately 4 to 10 mils in diameter, are in registry in the laminated structure and form a grid. The grid allows the addressing of individual pixels by modifying the electrical field within each hole. The electrical field within each hole is the summation of the electrical fields created by each grid element due to its position and applied voltage. The electrical field allows or forbids passage of electrons from the cathodes to the anode, and focuses or defocuses the beam of electrons. Additional holes in the laminated grid structure are used for conductive vias, which bridge a conductive path between conductive traces on one layer and conductive traces on different layers.

One example of a low temperature glass ceramic material which can very advantageously be used for the purposes of this invention is DuPont's Green Tape (trademark of DuPont). This material, available in very thin sheets (e.g. about 3 mils to 10 mils) has a relatively low firing temperature, about 900° to 1000° C., and includes plasticizers in the unfired state which provide excellent workability, particularly in the forming of tiny, closely spaced holes for the addressing grid of the invention. The Green Tape product is a mixture of ceramic particles and amorphous glass, also in particulate form, with binders and plasticizers. See DuPont U.S. Pat. Nos. 4,820,661, 4,867,935, and 4,948,759. The material in the unfired form is adaptable to deposition of conductive metal traces in a glass matrix, such as by silk-screening or other techniques. Other materials, having the desired pliability in the unfired state, such as devitrifying glass tape, ceramic tape or ceramic glass tape material, and possibly amorphous glass in a flexible matrix, are also adaptable for the purposes of the invention; the term "glass ceramic" or "ceramic" is used generally herein to refer to this class of materials. Broadly speaking, the requirements of such a material are that (a) it be producible in thin layers, (b) the layers be flexible in the unfired state, (c) holes can be put in a layer or several layers together in the unfired state, (d) the holes can be filled with conductors where desired, (e) conductive traces can be put accurately on the surfaces of the unfired layers, (f) the layers can be laminated, in that they are bonded together at least on a final firing, (g) the fired structure have a coefficient of thermal expansion that can be substantially matched to that of a face plate and a back plate of preferred materials such as float glass, (h) the fired, laminated structure be rigid and strong, (i) the fired structure be vacuum compatible, (j) the fired structure not contain materials which will poison the cathode of the CRT, and (k) all materials and fabrication be possible at practical cost. While the preferred materials appear to be the class of glass/ceramic materials mentioned above, other materials having these characteristics or most of these characteristics are becoming available. Polyimides, as an example, are very high temperature, high strength vacuum compatible plastics used for the fabrication of multilayer printed circuit boards in such applications as electronics used in space.

As used in the method and construction of the invention, the unfired tape layers with formed holes and deposited metal traces are laminated together at appropriate low temperatures (typically 70° C. in the case of the DuPont Green Tape product) and pressures. This step fuses the layers into a single unit. The laminated layers are subsequently fired to burn out the binders and plasticizers from the tape (approximately 350° C. in the case of the DuPont product).

The final firing (900°–1000° C. in the case of the DuPont Green Tape product) is high enough to sinter the glass particles so that they flow together sufficiently to integrally bond the glass ceramic layers together. Preferably a multi-temperature firing is used, following a prescribed profile, taking the temperature from room temperature through the burnout temperature to the final temperature and back to room temperature. In this way a fused together, integral addressing grid structure is formed, with conductive traces between the integrally bonded layers and extending to the edges of the structure for connection to driving electronics.

Fusing occurs by glass bonding between the layers, in the case of the DuPont product. The integral, self-contained addressing grid structure is achieved with only relatively low firing temperatures, and the materials and method of construction afford efficiency and economy in manufacture.

As an alternative to fusing the layers by firing as described, interlayer bonding can be achieved by diffusion bonding or crystal growth across the boundary (or a combination of these processes). In these processes, pressure is often used to assure intimate contact to facilitate the bonding process. These types of bonding can be used with materials other than glass ceramics or the family of ceramic tapes as defined herein. For example, in certain applications a pure ceramic (containing no glassy phase) might be utilized. In such applications the fusing together of the layers is carried out by solid state diffusion or crystal growth across the interface.

It has been found that a relatively dense grid of holes can be achieved in the unfired tape material, the integrity and spacing of which are maintained through the firing or with controlled, uniform shrinkage. For holes of 7.5 mil diameter, a density of 3460 holes per square inch has been achieved, through layers of about 10 mil thickness. Holes of 4 mil diameter have been achieved at 1600 holes per square inch, through 3.5 mil thickness, which would be appropriate, for example, in a 10 inch diagonal VGA display. One preferred method in accordance with the invention for forming the holes comprises punching the holes in the unfired state, using compressed gas or hydraulic (fluid) pressure. In this preferred method a single layer of the green tape is placed against a die having the pattern of the multiplicity of holes. A similar, cooperating die may be used, with the sheet of material clamped between the two dies and all of the holes in registry. High pressure air, other gas or liquid (which may be in a sudden burst) is used to blow plugs of material out of the unfired tape, leaving the desired grid of holes without distorting the remaining material. Further, after the layers have been put together in an unfired laminate, the holes can be cleared, aligned and reamed to full dimension using an abrasive/fluid medium passed through the openings while the laminate is held in a cooperative die having the hole pattern.

The holes may be in shapes other than circular; oval, racetrack-shaped, rectangular or other shapes can be advantageous as pointed out below.

The multiple layer laminate structure provides additional advantages. The anode, i.e. the back of the face plate, and the cathode need not have any feed throughs, since all leads can be fed out the edges, buried within the multilayer structure and not interfering with any sealing. The voltage and current leads into the tube for cathode and anode can be conducted through a peripheral area of one layer, outside the seal, then through conductive vias and transferred under the seal at subsurface levels between layers. Another via or succession of vias can bring these electrical paths back up to whatever layer is appropriate.

In another aspect of the invention, the flexible unfired glass ceramic material from which the addressing grid laminate is formed contains a metal oxide substance which is utilized to form a built-in surface resistance sufficient to avoid cumulation of charge on surfaces. It has been known in electron tubes to place a conductive coating such as a thin layer of titanium (formed into $TiO_x$, x typically less than 2) on insulators to keep them from charging up in operation. Various types of conductive coatings have been used for this purpose, typically applied by sputtering onto exposed surfaces. Sputtering is a line-of-sight process, so that the multiplicity of holes in the addressing grid as in this invention would be difficult to coat. A swash plate or similar arrangement might have to be used in order to assure that the conductive coating is applied on the surfaces of the holes themselves. Another approach is to use ion plating which plates onto most surfaces, even non-line of sight.

An alternative to introducing any coating to the grid laminate structure is to take advantage of a material contained in the initial glass ceramic layers which can be made to become slightly conductive in a later firing. In one preferred form of this method, lead oxide is included in the glassy phase of the tape (DuPont's Green Tape, for example, has this component, but it can be added if not present). Upon firing in a reducing environment, some of the lead oxide reduces to lead suboxides and metallic lead. The result is a slightly conductive coating, limited to the surfaces, including the surfaces inside the holes, because of the controlled reducing environment and the isolation of the lead oxide based material below the surface. The process is diffusive, with $H_2$ reducing the $P_bO_3$ to both sub-oxides $P_bO_x$ and elemental lead, where x is 3 or less. The $H_2$ must diffuse into the ceramic to do so; thus the reduction occurs on exposed surfaces first. Processing time and temperature are used to control the resulting resistance.

The invention also encompasses a complete flat screen CRT itself, with the addressing grid assembled together with a back plate, a face plate and an electron producing cathode assembly, and substantially evacuated and sealed together. In one embodiment of the invention the face plate is formed not of a single sheet of glass with phosphor deposited on the glass, but as a further sheet of rigid material having a multiplicity of holes, in registry with the electron-passing holes of the addressing grid structure and closely spaced to the addressing structure. The face plate then comprises a glass ceramic sheet similar to those forming the addressing grid lamination, but with glass deposited in each of the holes and then coated on the inside of each glass plug with the appropriate phosphor color.

The face plate, whether of a single sheet of glass or of the glass-filled construction described above, is advantageously supported against the addressing grid structure, which in turn is supported against the back plate by similar ridges or other supports, by a series of ridges formed on the outer surface of the addressing structure, in a honeycomb type arrangement. The ridges, which may follow zig-zagging or serpentine paths for added strength and appropriate spacing from the holes, may be deposited on the green tape surface and fired along with the addressing laminate, or they may be deposited after firing by an appropriate thickness-controlled process. Discrete points or columns may be deposited as supports on the addressing grid surface, rather than ridges. Injection molding techniques can be used to produce the supports or stand offs. In this approach the glass-ceramic material can be formulated to allow injection molding of the ridges directly onto the laminated grid structure.

Another approach is to use the equivalent of expanded metal honeycomb over the surface. Strips of unfired glass ceramic material are joined periodically to form a diamond pattern when the set of strips are expanded or separated. Methods such as ultrasonic welding can be used to periodically join the layers of the unfired glass ceramic. Gas flow through the grid holes can move the honeycomb out of the way of all grid holes, ensuring that no holes are obscured. The standoffs preferably are fired simultaneously with firing the grid.

Small-screen embodiments can be produced without standoffs between the grid and the face plate, simply relying on the strength of the glass plate, or far fewer standoffs/spacers can be used.

In large-screen embodiments, plural addressing grid sections or modules can be assembled edge to edge, with traces discontinuous across the joints between modules. Addressing of the modules is synchronized for the composite display.

In another important aspect of the present invention, the ceramic plate comprising the addressing grid structure provides a mounting for the integrated circuits of the electronics. The conductive traces deposited on the various layers of ceramic material extend to the outer edges, beyond and beneath a seal which closes the evacuated chamber around the periphery. The conductive traces preferably are not present on the outermost layers of the ceramic laminate where the seal must contact the surfaces, but only between layers; Sealing can be done directly over surface traces, but this requires materials compatibility between the sealing frit and the traces, requires a hermetic seal between the trace and the ceramic below, and can compromise the conductivity of the traces. Also this limits surface area available for traces, limits the types of solder glass that can be used and limits the processing cycle. Outside the vacuum tube, i.e. outside the seal in a peripheral space on the ceramic laminate, the integrated circuits are mounted and in conductive contact with the conductive trace leads, to facilitate addressing of individual pixel holes in the addressing grid, in accordance with an incoming signal to the electronics.

Addressing of individual pixels in the system of the invention is accomplished by establishing, in conjunction with the cathode arrangement, a threshold level of electrical field at the addressing grid, required to induce electron flow through addressing holes of the grid. Each of a series of layers has conductive traces around the addressing holes, such as three to ten layers/interfaces with such conductive traces. If there are, for example, four layers or interfaces with conductive traces at each addressing hole, an appropriate voltage applied to all four will be required before sufficient electrical field exists to attract electrons through the hole. In this way, the various layers act as an AND gate, and the addressing is accomplished by encoding of groups of holes and groups of pixels at each layer so that wiring is not required to each of the many holes individually. Binary, octal or other type encoding may be used. At one level, the entire multiplicity of holes may divide into only two regions; whereas many separate regions, such as four, eight or sixteen regions repeated and respectively wired together, may be present at other layers/interfaces.

Color addressing preferably is a part of this encoding. The system preferably addresses the screen by row scans, i.e. an entire row is activated simultaneously, followed by the next succeeding row below, etc. down the screen. A particular row may be selected by applying appropriate voltages to all conductive traces associated with that row.

A particular hole in the row is activated by activating the conductive trace or traces associated with the column containing that hole.

All column conductive traces which are to provide information in the particular row scan will be activated simultaneously, in a preferred arrangement. Further, in this embodiment an additional layer or interface will be required to complete the ANDing of the conductive traces—the color information R, G or B. The system preferably uses time division multiplexing of the R, G and B information, with R data put to an entire column (R, G and B) when all R holes are active, G data put to the column when G holes are active, etc. This preferred approach of multiplexing the color information reduces the drive electronics costs. If higher brightness is desired then all three colors can be driven simultaneously increasing the brightness at the cost of additional electronics (as well as more leads extending from the grid). Three separate drivers would be required for the red, green and blue data, rather than a single driver which time multiplexes input data (as column data) into one-third time divisions. In the preferred approach each color potentially has one-third of the time of each row scan, but will normally be active less than this potential duration, with duration of each color determined by brightness prescribed for the particular pixel and color. Each color will be input to the column in order.

In other words, encoding of the individual color pixels may be accomplished by having one conductive layer which provides individual addressing of each row (across) of pixels (each pixel being a triad of color dots); another conductive layer which individually addresses each column of pixels; and a third conductive layer which addresses, in columns, all red (R) as one common conductor, all green (G) as another common conductor, and all blue (B) as a third common conductor, so that R data is synchronized with R hole activation, G data with G hole activation, and B data with B hole activation. Thus, only three conductive leads extend from the RGB layer, and these three leads can be activated in accordance with a multiplexer which time division multiplexes input data by R data, G data and B data successively.

It should be pointed out that the glass ceramic tape which is used in accordance with the invention lends itself very well to providing such a multiplicity of leads from a single layer. The tape material is designed for hybrid circuit devices and multiple layer interconnections and therefore has been optimized for fine pitch, such as required here. Printing on unfired glass ceramic material before firing enables finer conductive trace lines to be printed, since the printing material is somewhat porous and the printed lines will not blush as they tend to on non-porous fired ceramic.

It should also be noted that the use of the low temperature glass ceramic material described in conjunction with the invention is versatile enough to allow the use of four color pixels instead of the three color pixels primarily described herein. The tape layers can vary in number from about three or four to perhaps eight to ten or more. In commercial interconnect circuit applications of this type of material, the number of layers has exceeded 50. Experimental interconnect devices have exceeded 100 layers.

A further advantage of the glass ceramic material is the ability to match its coefficient of thermal expansion to that of the face plate (preferably a glass sheet) and to the back plate. The coefficient can be selected (by formulation of the glass ceramic) such that a slight compression is put on the grid structure upon cooling after firing.

Importantly, the glass ceramic layers are each thin so that a thin addressing grid laminate results. The limited thickness is important in that latitude in focussing of electrons through the holes is enhanced by limited depth of the addressing holes. The contribution of the glass ceramic material (or other thin layers of glass and/or ceramic or other materials, workable in the unfired state) to this aspect is an important feature of the invention. The thickness of each layer is selected to assure that the trace capacitance is within a desired range, and not so thin as to raise capacitance too high; 3 to 5 mils thickness is preferred.

Screen printing can be used to place the conductive traces and is presently preferred. However, screen printing tolerances impose a practical limit on the closeness of the printed conductive traces and consequently on discrimination between holes of the adjacent columns. Current design limitations (design rules) in screen printing, which are approximately four mil trace/four mil spacing, will limit the small screen size which can be achieved at a given resolution. Other types of printing can be used to achieve higher resolution; or, as the design rules in screen printing eventually become finer, picture size for a given resolution can be reduced. However, even without improvements in the printing design rules, the construction of the invention provides a solution to this problem. In a system where each column of red, green or blue holes is to be addressed individually, requiring close spacing between adjacent traces, the conductive traces can be divided into alternate layers, avoiding the proximity problem. The same thing can be done for separation of whole pixel columns in another form of the invention, or the separation of row columns. An additional layer always can be interposed so that successive layers contain alternate row addressing traces or column addressing traces.

Generally speaking, the invention distinguishes from prior systems and structures by providing simultaneously a large number of features and characteristics which make the system not only function as desired but also economically feasible in production. These features are in large part supported by the class of materials having the characteristics discussed above. The unfired material is flexible and allows hole formation, accurate deposition of conductive traces, via formation and filling, and handling without breakage, during use in very thin sheets. In the fired state the multilayer rigid laminate is strong and dimensionally stable, is unitary and truly integral but with subsurface traces, retains the precise pattern of holes, vias and traces because of uniform shrinkage, is vacuum compatible and non-poisoning to the cathode, and can be substantially matched in thermal expansion coefficient to a face plate and a back plate. In addition, the rigid laminate structure allows direct mounting of driver chips to the rigid laminate. Cavities can be formed in the structure, in the size of the chip and through one or several layers, to index the chip location for bonding. This allows flexibility of routing for lowest cross-talk and capacitance, and permits high density of trace connections to the driver chips. Still further, the structure of the rigid laminate permits all types of chip bonding so that the lowest cost technique can be used (tab, flip chip, SMD, etc.).

Although the other described attempts at a flat screen display have, like this invention, also been aimed at a multiplicity of small conductors held in a grid or grids and separated by glass or ceramic insulating materials, this invention differs in that the conductors can be placed by lithography or screen printed onto a thin, flexible, non-fragile series of layers which are later laminated into a rigid, robust grid structure with dependable results. High yields will result due to the accuracy of trace formation, handle ability of materials and the ability to inspect and correct before lamination, including with automated inspection techniques. Economy of manufacture is achieved, a failing of all previous attempts at flat screen CRT displays.

It is therefore among the objects of this invention to provide an improved construction for a flat screen CRT display, particularly in respect of the addressing grid structure for introducing electrons against an electron-excitable display medium. The construction of the invention enhances reliability of the display, the low profile of the display and cost efficiency in manufacture of parts and assembly of the display.

These and other objects, advantages and features of the invention will be apparent from the following description of preferred embodiments, considered along with the accompanying drawings.

DESCRIPTION OF PREFERRED EMBODIMENTS

Figure 1:
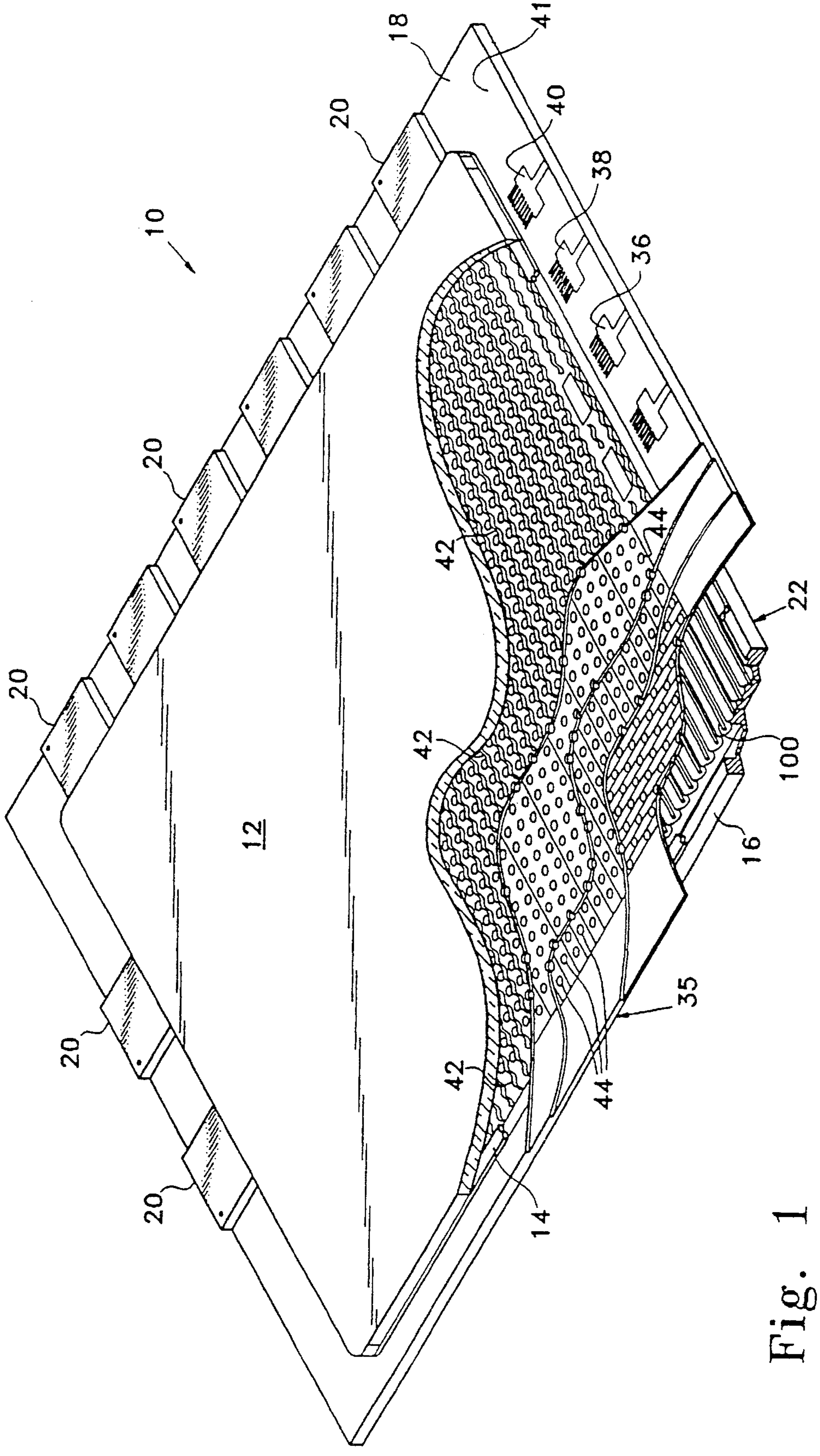
FIG. 1 is a simplified perspective view showing a flat screen CRT display in accordance with a preferred embodiment of the invention.

The drawings, particularly FIG. 1, show a flat screen, low profile CRT display 10 which has a face plate 12 over a viewing area, a seal area 14 peripheral to the viewing area, a back plate 16 and a peripheral region 18, outside the seal, having electronics 20 including driving circuitry for addressing the movement of electrons against the back, phosphor-coated surface of the face plate 12, which is the anode of the system.

Figure 2:
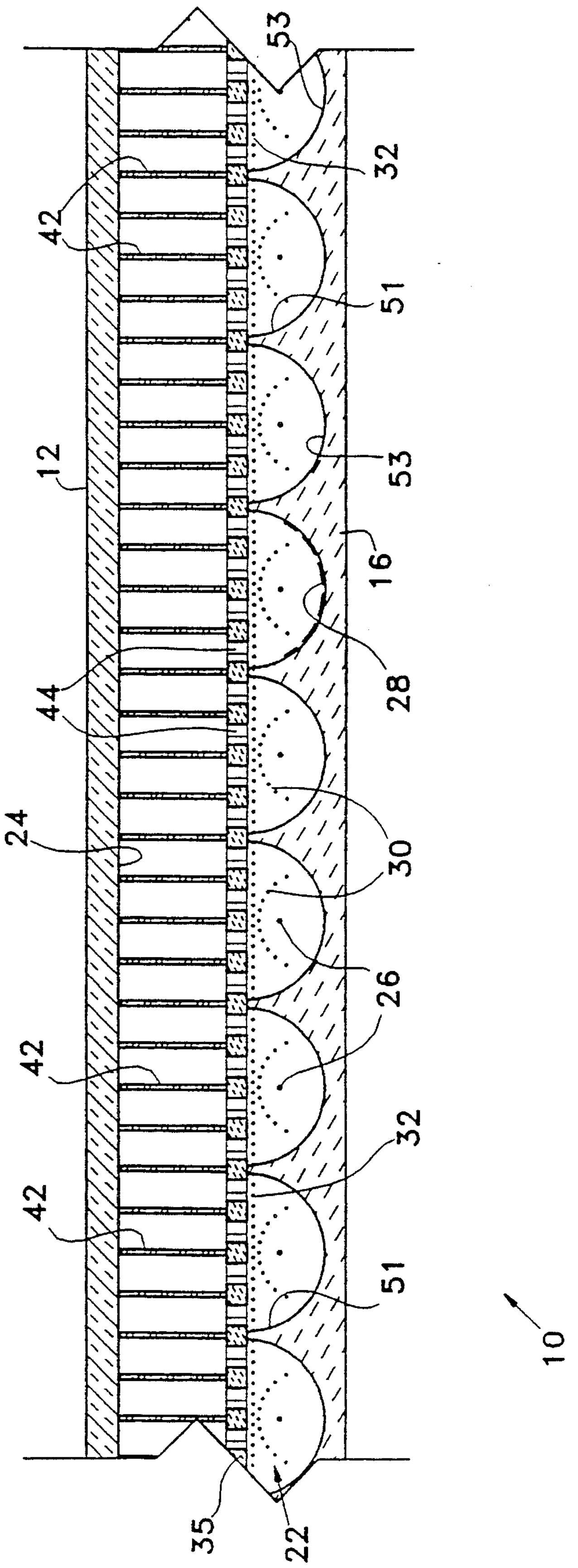
FIG. 2 is a sectional view showing a portion of the flat CRT assembly of FIG. 1.

FIG. 2 shows the CRT display 10 in cross section, schematically indicating certain components. The flat screen display device 10 includes a cathode generally identified as 22 for supplying electrons for use in addressing the back anode surface 24 of the face plate 12. Although any of several different types of cathodes may be used, the illustrated cathode comprises a thermionic cathode in which source filaments 26 are heated to give off electrons. A backing electrode 28 may be included, for encouraging the electrons to travel in the direction of the face plate and for reversing the direction of most electrons which do not. The cathode arrangement may also include an electron steering grid 30 (shown in dashed lines), and an accelerating grid 32.

An addressing grid structure 35 is adjacent to the face plate, and this addressing grid, preferably formed of a low temperature cofired glass ceramic material or "green" tape, has an advantageous construction forming an important part of the invention. In this description and in the claims which follow, the term "ceramic" is often used, in the context of ceramic tape or a ceramic layer or ceramic sheet. The term is intended to refer to any of a known family of glass ceramic tapes, devitrifying glass tapes, ceramic glass tapes, ceramic tapes or other tapes which have plastic binders and ceramic or glass particles and which are flexible and workable in the unfired state, curable to a hard and rigid layer on firing, as well as other materials equivalent thereto, which are initially flexible and may be processed to a final hard and rigid state.

FIG. 1 indicates schematically that conductors 36, 38 and 40, in a preferred embodiment of the invention, may pass along the surface 41 of a glass ceramic layer which comprises the outside surface of the addressing grid 35, in the peripheral area 18. These conductors, which may provide connections for a "getter", for cathode power and for anode power, pass under the vacuum seal 14 in a manner described further below, an important feature which is made possible by the structure of the multilayer addressing grid of the invention. A getter is a material placed inside a vacuum tube which permanently traps harmful gas such as oxygen.

The electronics 20, also mounted on the peripheral area 18 which comprises an extension of the addressing grid 35, include ASIC drivers which control the transmission of electrons through the addressing grid 35. Alternatively, these drivers 20 can be positioned inside the vacuum, i.e., outside the region of the addressing holes 44 and within the sealed area (requiring more peripheral space inside the seal).

Also indicated in FIG. 1 are spacers 42 (also called supports) on the surface of the addressing grid 35, which may be relatively thin and which provide a network of support for the glass face plate 12, against the effect of near-perfect vacuum existing inside the tube under the glass. The supports 42, as will be further discussed below, may be formed in several different ways and must be positioned around a multiplicity of small holes 44 in the addressing grid, the holes forming pathways for the movement of electrons from the cathode 22 to the back surface 24 of the face plate (see FIG. 2).

It is emphasized that the drawings are illustrative only, are not to scale and do not show the actual number or density of holes 44, as well as not being to scale in every case.

Figure 4:
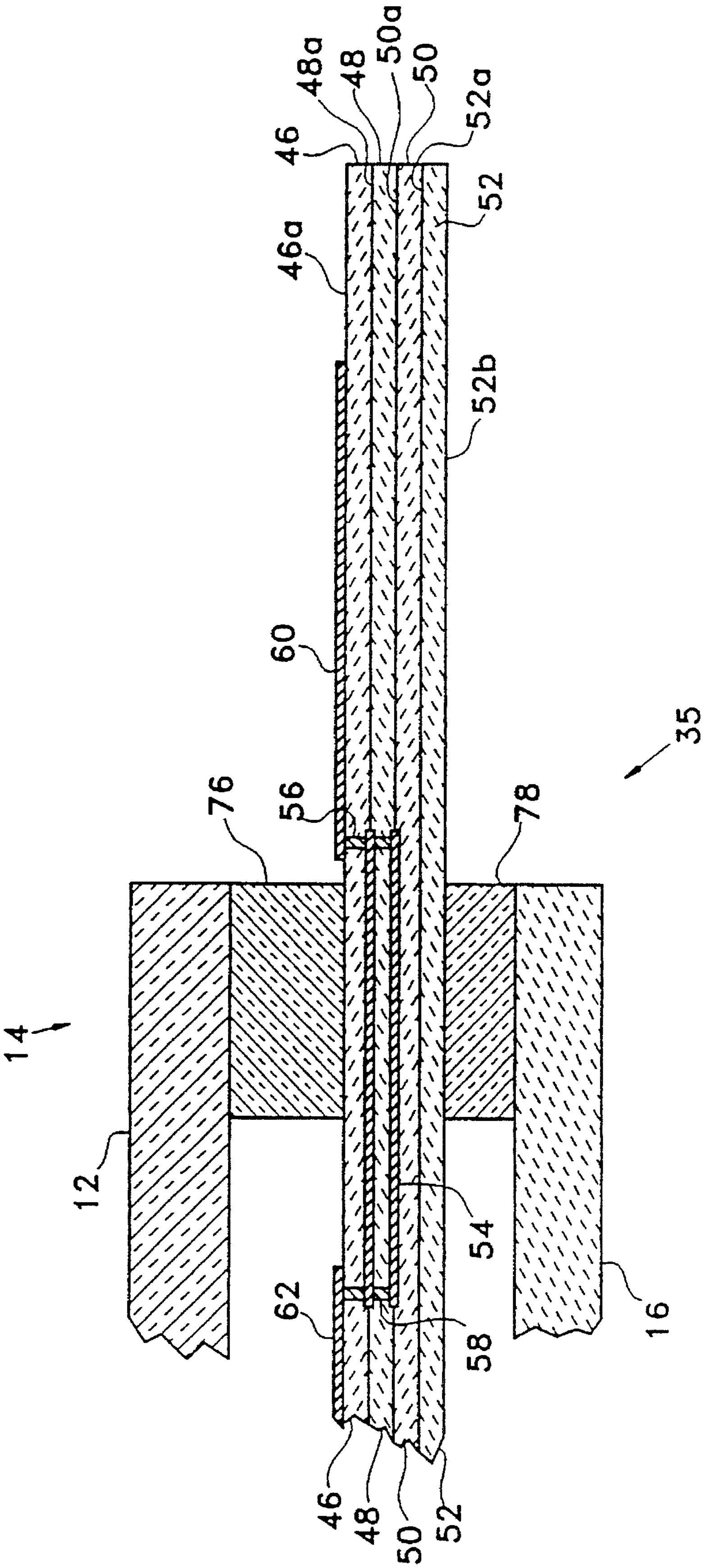
FIG. 4 is a sectional view as seen along the line 4—4 of FIG. 3 (with the face plate included), again illustrating transfer of conductive paths in a peripheral region of the assembly, from the active area to outside the vacuum seal.

FIGS. 2 and 4 show that the addressing grid structure 35 is formed of a plurality of laminated layers, preferably glass ceramic layers as discussed above. Thus, FIG. 4 shows four layers, 46, 48, 50 and 52. These layers are undiscernible in the laminated and fired addressing grid 35, having been fused essentially into a single structure. The layers have been irrevocably bonded by the flow of amorphous glass between them, but in this description the layers are still referred to as discrete layers in that the conductive traces at their surfaces form discrete planes within the monolithic structure. The traces may be at original layer interfaces 46*a*, 48*a*, 50*a* and 52*a* (the bottom surface 52*b* can also be included), whether deposited on the top of one layer or the bottom of the adjacent layer.

As outlined above, the holes 44 through the glass/ceramic layers of the addressing grid 35 are in registry from layer to layer (layers not visible in FIG. 2) and are positioned to direct electrons from the cathode 22 against phosphor dots on the anode 24, i.e. the back surface of the face plate 12. In a color display each phosphor dot comprises a part of a pixel. For the admission of electrons through a particular addressing hole 44, there must be a level of field present, exceeding the threshold (or cutoff) level and this threshold level is reached only when all layers/interfaces of conductive traces about the particular hole have appropriate voltages present.

Even if all but one layer is activated at the particular hole, electrons will still not pass through to the anode. Thus, each conducting layer acts as part of an AND gate, permitting the use of encoding of the addressing holes so that far fewer conductive leads are required to connect the addressing grid to the driving chip or chips. Encoding arrangements are discussed further below.

In a preferred embodiment the trace voltages are in the range of 5 to 25 volts above the cathode voltage. The cathode voltage typically is ground, but can be other voltages. To assure low cost in the drivers, the on/off voltage swing ideally should be kept below 25 volts.

The sectional view of FIG. 2 also illustrates the positioning of the face plate supports 42, between addressing holes 44. These supports 42, which need not be present between every pair of adjacent holes 44 or every row of holes, provide a sufficiently closely spaced web or network of support for the face plate 12 that the face plate can actually be quite thin and is well able to withstand the pressure caused by near-perfect vacuum existing inside the tube. In this way the face plate is able to be perfectly flat if desired, in contrast to traditional CRTs wherein a relatively heavy face plate was bowed or arched outwardly to help withstand the vacuum. The supports 42 may comprise sinuous ridges as indicated in FIG. 1. The sinuous aspect adds greatly to the strength of the preferably very thin supports and support ridges, and also can insure that the supports do not unduly interfere with the flow of electrons from the addressing holes 44.

These supports 42 may be formed by several different processes, as further discussed below in reference to FIG. 7. However, one preferred process is to use glass ceramic layers such as those used in the addressing grid itself, with the unfired glass/ceramic material stamped out to leave a desired pattern of ridges as a web which will be non-coincident with any of the active addressing holes 44 in the finished assembly.

FIG. 2 also shows rear supports 51 for engaging the back of the addressing grid 35 between holes. These supports or support ridges 51 are between troughs or recesses 53, each of which provides space for a longitudinally-running cathode wire 26. Semi-circular/cylindrical crenulations are shown in FIG. 2 and are preferred, although other shapes can be used. Techniques for forming these support ridges 51 and troughs 53 are described further below.

The following table gives an example of dimensions for one embodiment of the invention.

TABLE II

DIMENSIONS OF EXAMPLE DISPLAY

| | |
|---|---|
| Glass Faceplate Thickness | .080 inch |
| Anode Spacing from Gride | .150 inch |
| Addressing Grid Thickness | .032 inch |
| Back Plate Spacing from Gride | .250 inch |
| Glass Back Plate Thickness | .080 inch |
| Addressing hole dimensions, 17 inch diagonal 1024 × 768 display: | |
| Triad to Triad Spacing | 13.3 mils |
| Hole Size (diameter as example) | 3.5 mils |
| Spacing, Edge to Edge of Holes | 5.4 mils |

Figure 3:
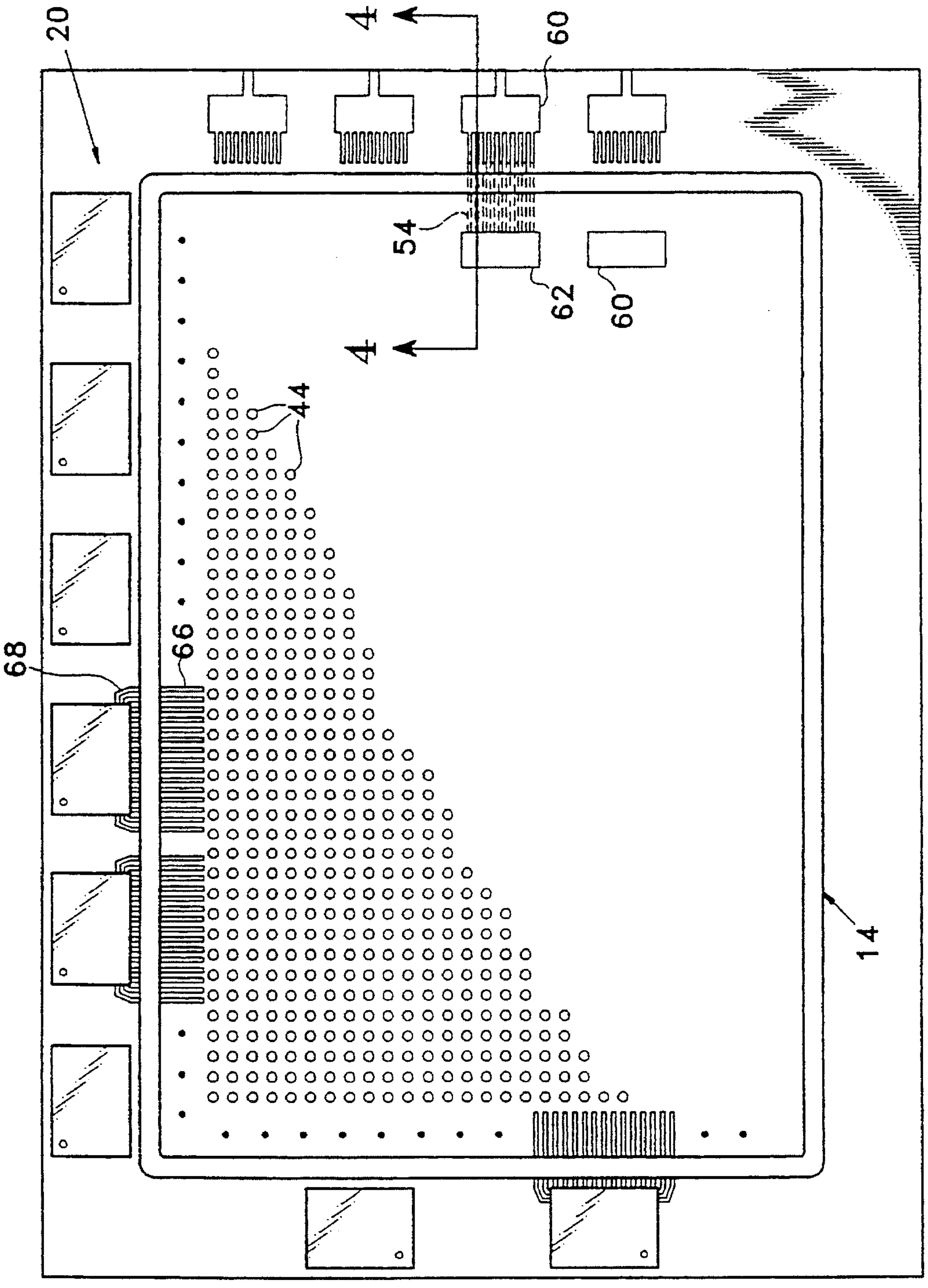
FIG. 3 is a schematic frontal plan view of the CRT assembly of the invention (with face plate removed), illustrating transfer of conductive paths from the active area of the addressing grid to peripheral locations outside a vacuum seal, and also illustrating locations of other features.

FIGS. 3 and 4 illustrate an aspect of the invention wherein, as discussed above, the seal area 14 is avoided with the conduction of leads from the interior of the tube to the exterior. Shown in FIG. 4 is a spacer 76 (see FIG. 6) sealed to the face plate 12 and to the addressing grid 35. A spacer 78 (see FIG. 6) is also seen, sealed to the back plate 16 and the addressing grid 35.

As FIGS. 3 and 4 illustrate, the laminated construction of the invention adapts itself very well to making connections to the addressing grid without requiring a vacuum seal to cross over conductors. The layer/interface **50*a* is shown with a conductive trace 54, or a series of parallel traces 54 as indicated. On assembly of the layers, the traces 54 will make contact with conductive vias 56 and 58, or series of conductive vias, comprising holes through the layers 46 and 48, filled with conductive material. At the top surface of the laminated addressing grid assembly, additional traces 60 and 62 have been deposited or printed, as contact pads. These illustrated conductors may be used for power feedthrough, such as for anode voltage, cathode power, getters and ground planes, as indicated schematically in FIG. 5, at the region 64. The contact pads 60 and 62 comprise some of the conductors 36, 38 and 40 indicated in FIG. 1**. It is an important feature that the conductive traces enable high voltage or high current feed through under the seal, through use of a series of parallel traces where needed.

FIG. 3, which is a view of the addressing grid structure with the face plate 12 removed, also shows a series of leads 66, which are actually far greater in number than shown, extending as traces from columns of the holes 44. These traces 66 do not pass through the seal 14, but under the seal, continuing as external leads 68 which connect to the ASIC driver chips 20. The upper surface **46*a* of the laminated addressing grid need not be used for conductive traces; if it is used, however, conductive vias carry the conductor paths underneath the seal 14, in the manner just described with reference to power leads, in FIG. 4**.

Figure 5:
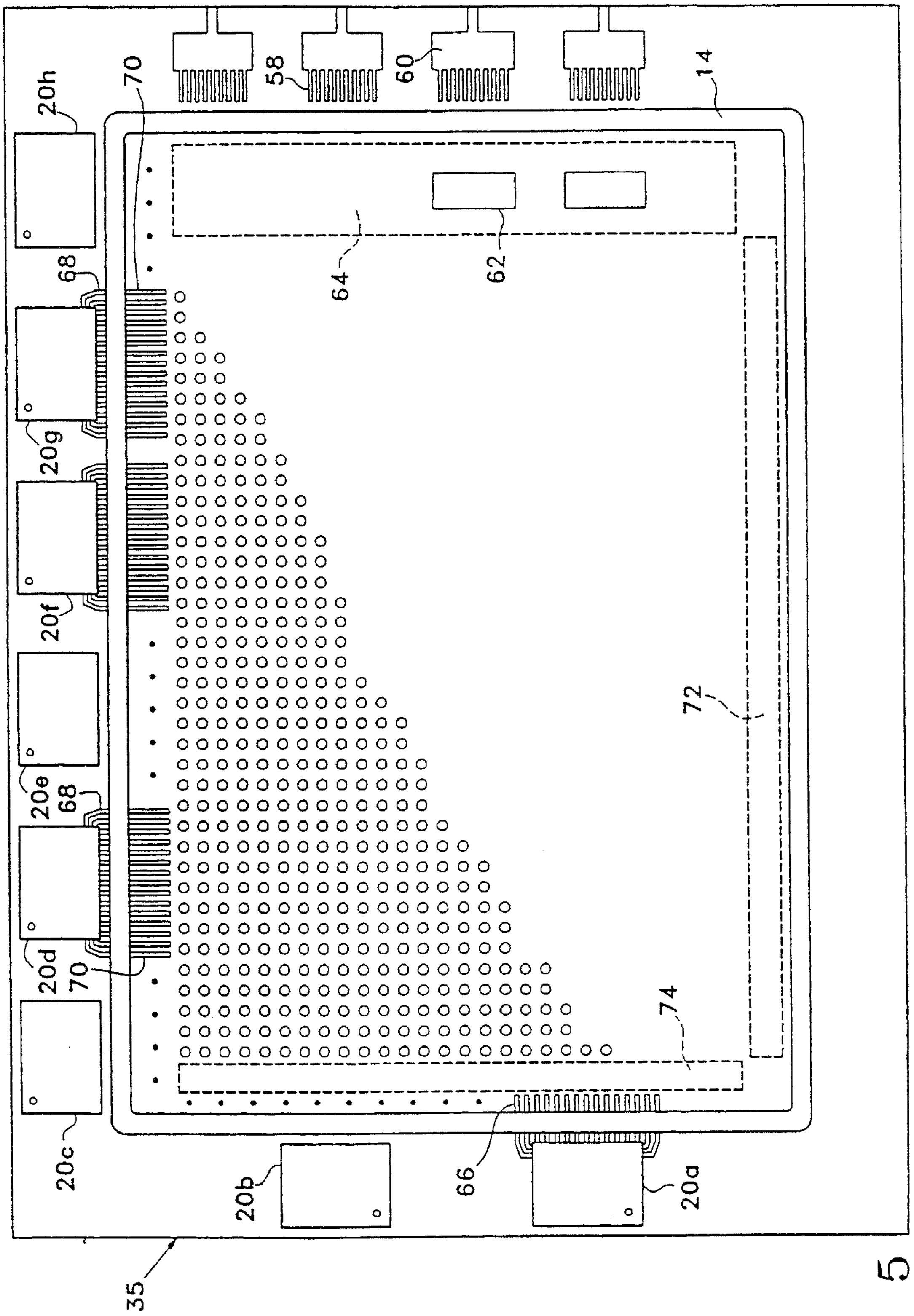
FIG. 5 is another frontal view similar to FIG. 3, with face plate removed, illustrating layout and arrangement of components around the active picture area of the CRT.

FIG. 5 is another schematic plan view showing an example of a layout for the system and electronics of the invention. The multilayer laminate grid structure 35 extends outside the seal 14 with at least some of the layers, as discussed above. ASIC drivers **20*a*, 20*b*, etc. through 20*h* are shown mounted on the glass ceramic laminate structure 35, near the periphery 18 of the structure outside the seal. Series of traces 66 and 70 may extend outwardly from the addressing grid area as indicated, and as discussed previously, these traces may be on the uppermost surface or between layers (but preferably are between layers when passing under the seal 14). The drawing shows layer transfer regions or interconnect regions 72 and 74, for the inter-layer conduction of traces, using conductive vias. The importance of these layer transfer vias will be more apparent from the discussion of encoding below. The interlayer transfer and the use of vias enables connections to be made without crossing other conductive paths and enables all signal containing paths to be brought up to a single layer, if desired, for connection to drivers such as the drivers 20*a* through 20*h*** indicated. Encoding of pixel information, which greatly reduces the number of conductive leads which ultimately must be brought out to the drivers, makes these interlayer transfers especially important.

Figure 6:
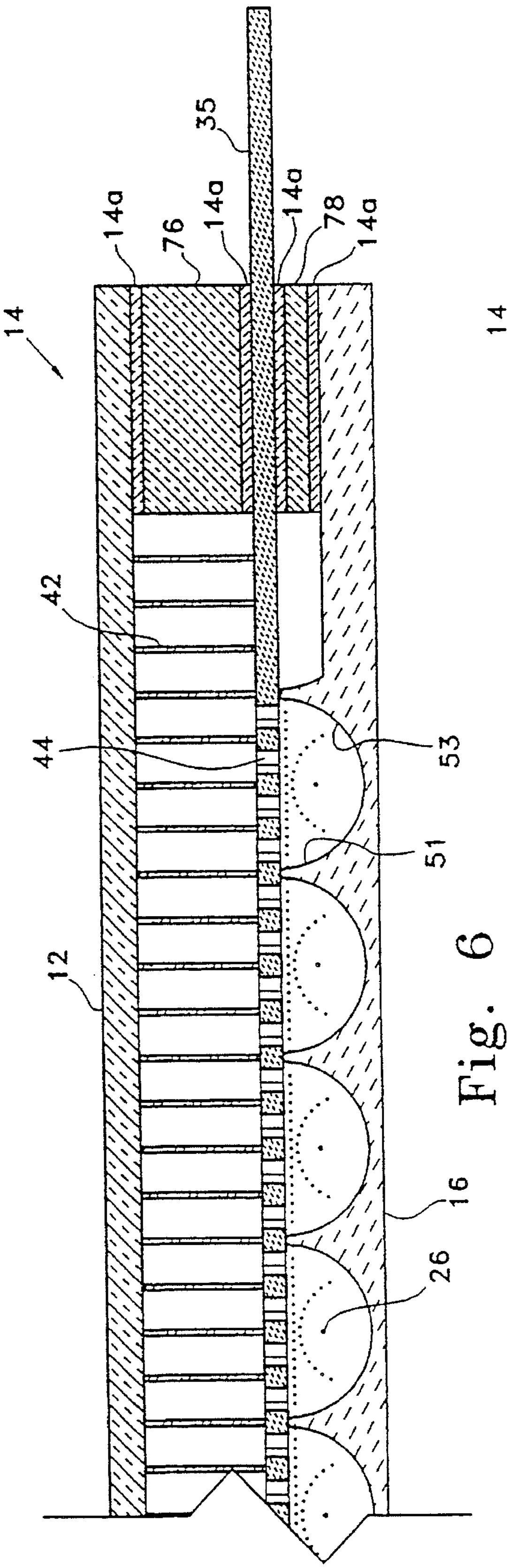
FIG. 6 is a schematic sectional view showing a seal area of the assembly shown in FIGS. 1 through 5.

FIG. 6 is a sectional view of one edge of the assembly, showing the multilayer addressing grid structure 35 extending through the seal area 14. Spacers 76 and 78 are shown above and below the multilayer structure 35, with the face plate 12 above the grid structure and the back plate 16 below. A few of the supports 42 (illustrated in FIG. 1) are also indicated, inboard from the spacer 76, and the spacers together hold the face plate 12 in position against the pressure created by vacuum existing in the tube. Back plate supports 51 are also visible in FIG. 6, supporting the multilayer grid 35 as spaced from the back plate 16.

Figure 6A:
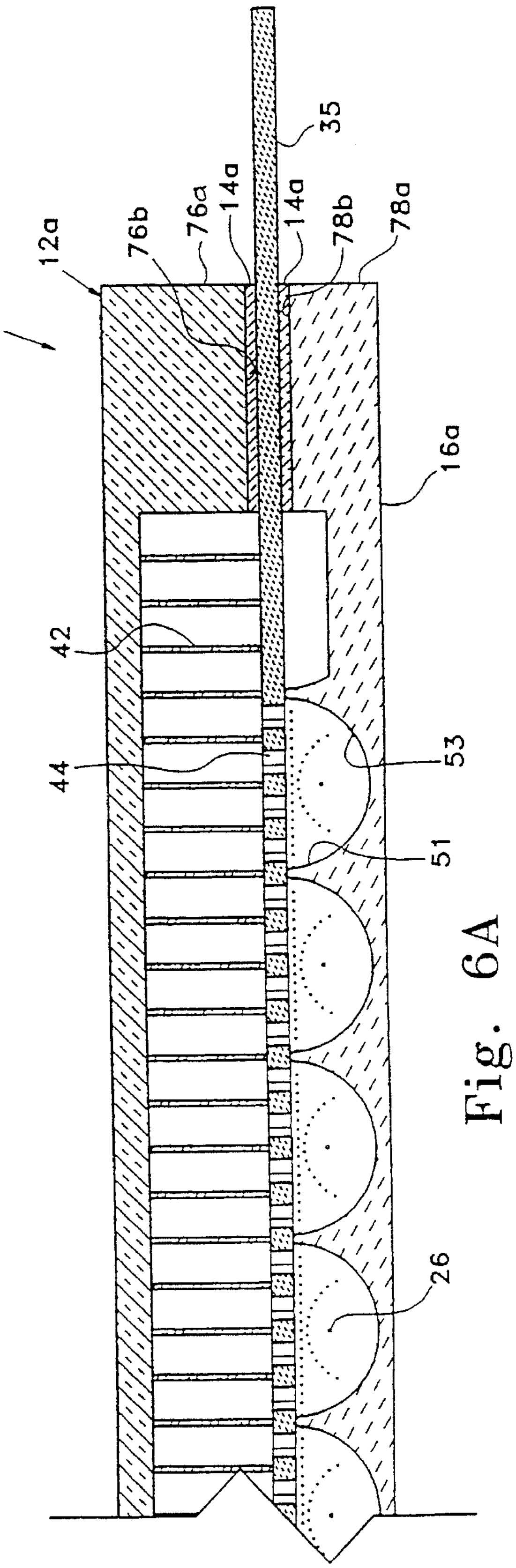
FIG. 6A is a view similar to FIG. 6, but showing an alternative feature relative to spacers of the assembly.

FIG. 6A shows an alternative structure wherein the back spacers 78 and the front spacer 76 at the seal are avoided. The back plate 16*a* is formed by a molding or casting technique, with an integral spacer comprising a boss 78*a* with a flat ridge 78*b* at the seal, at essentially the same height as the tips of the support ridges 51. A process for providing the back plate with supports 51 and troughs 53 is discussed in greater detail below.

FIG. 6A also shows a modified face plate 12*a* with an integral spacer 76*a* having a flat surface 76*b* for sealing against the grid structure 35.

At the seal area 14, the hermetic seal is made at all interfaces around the face plate/grid/back plate assembly), preferably with solder glass 14*a* for sealing between the glass/ceramic and glass materials (the solder glass thickness is not to scale). In the embodiment of FIG. 6, there are four interfaces; there are only two in the embodiment of FIG. 6A. Solder glass sealing is discussed in more detail below in reference to FIG. 7.

Figures 7A, 7B, 7C, 7D, 7E, 7F, 7G, 7H, 7I:
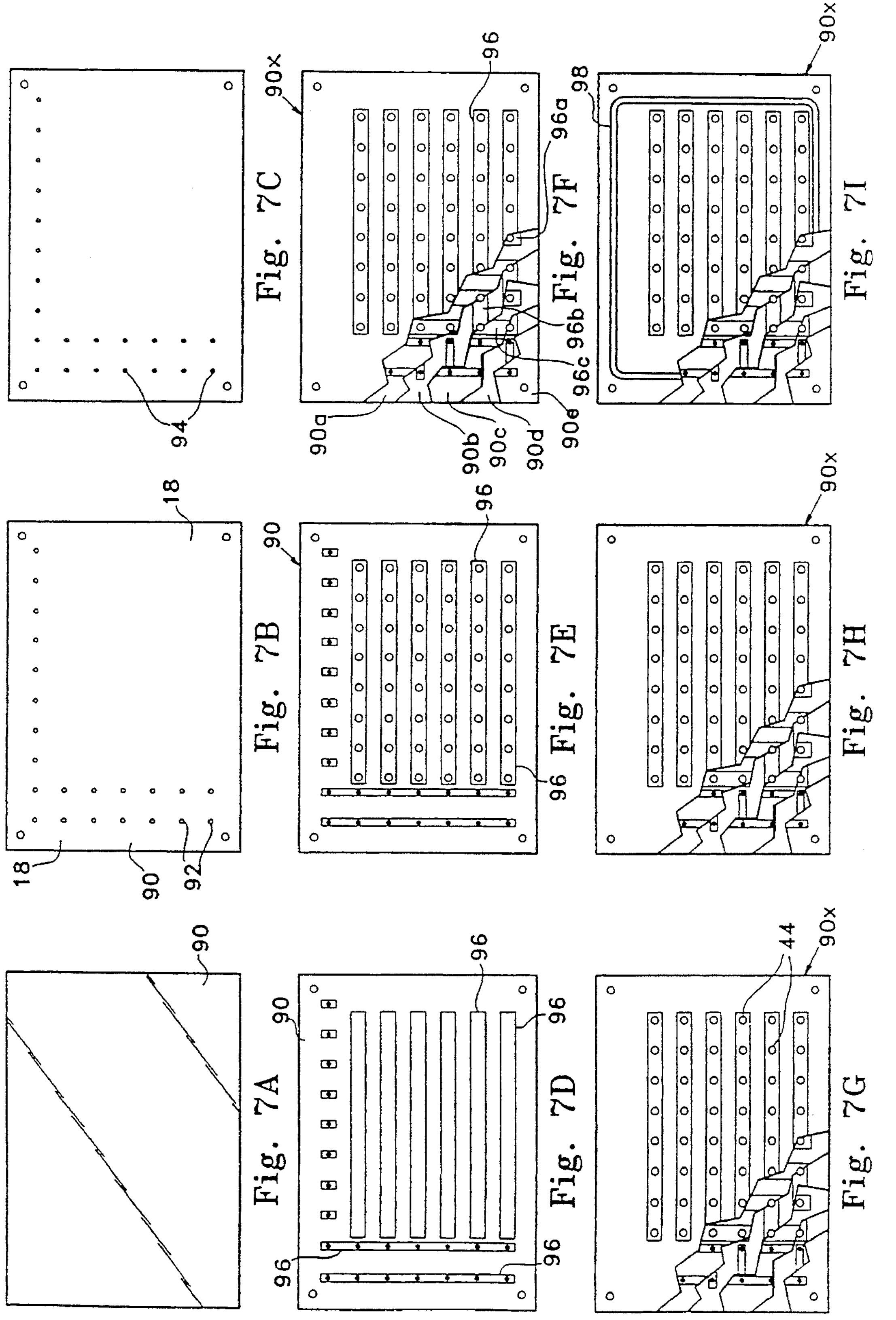
FIGS. 7A through 7X (sometimes together referred to as FIG. 7) collectively show steps in a sequence of formation and assembly of the components which form the flat screen CRT display of the invention.
Figures 7J, 7K, 7L, 7M, 7N:
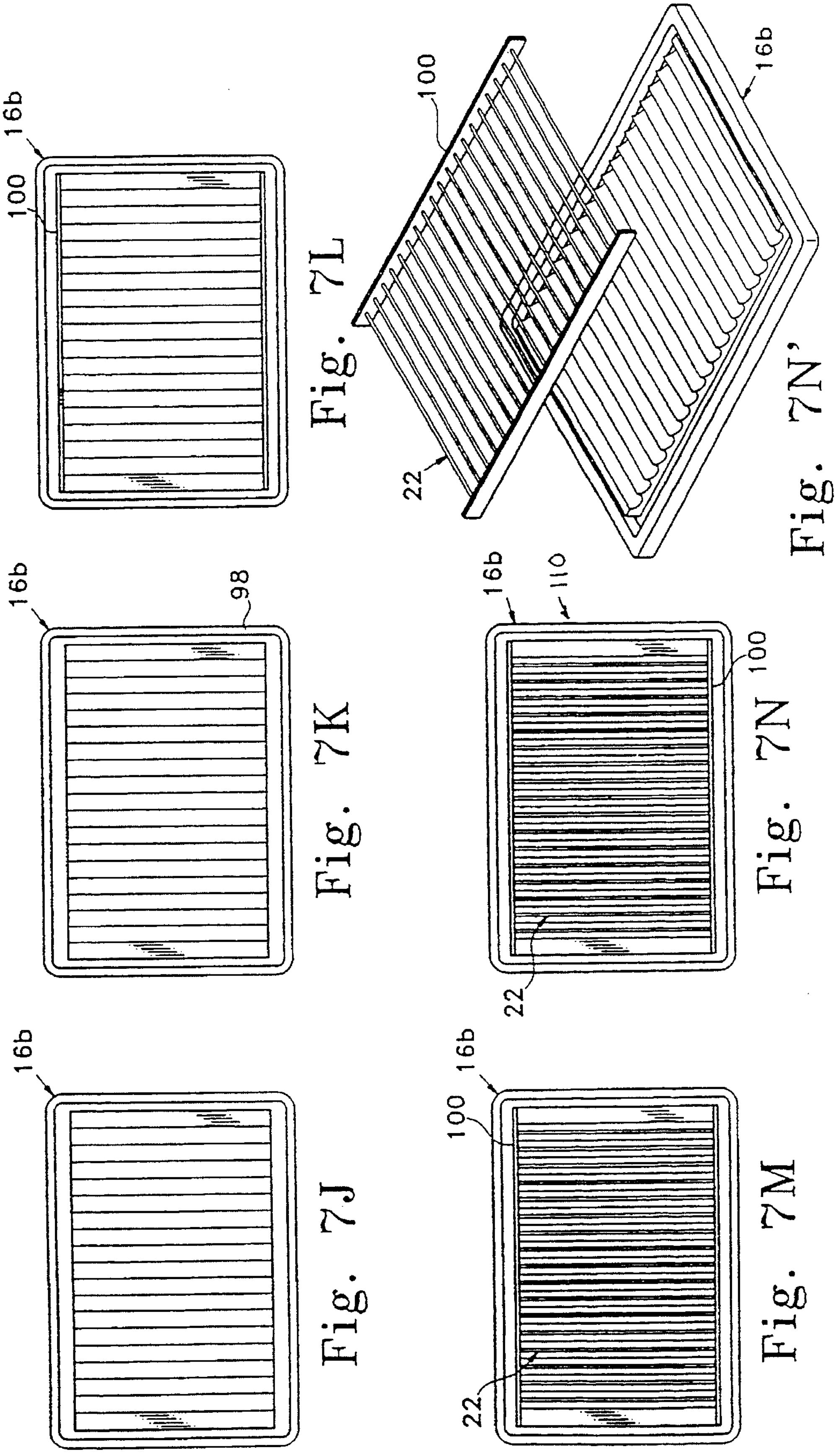
Figure 7R:
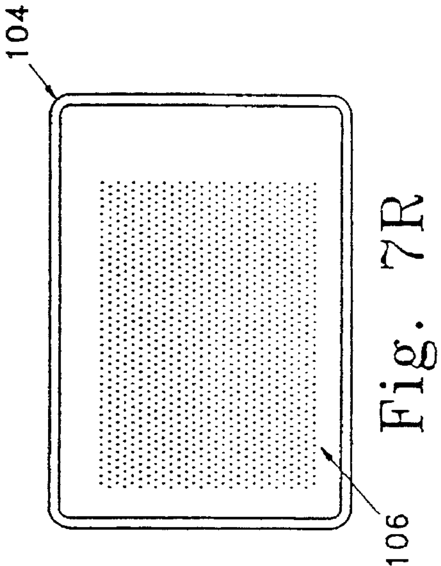
Figure 7Q:
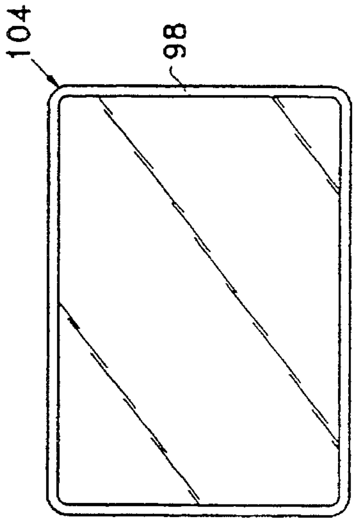
Figure 7P:
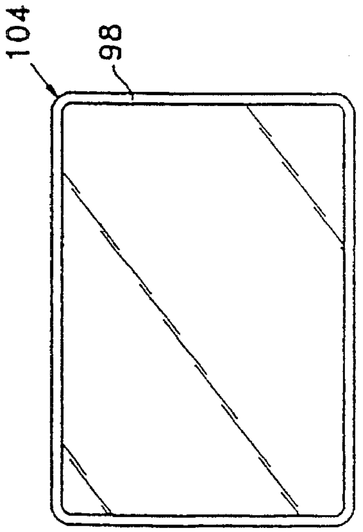
Figure 7S:
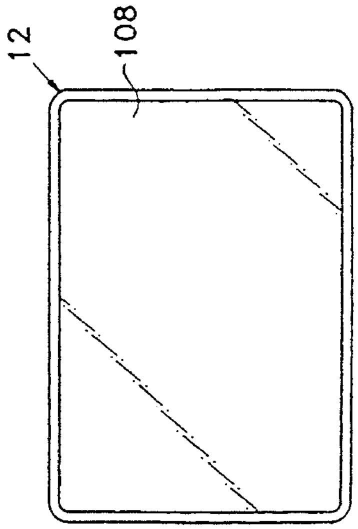
Figure 7W:
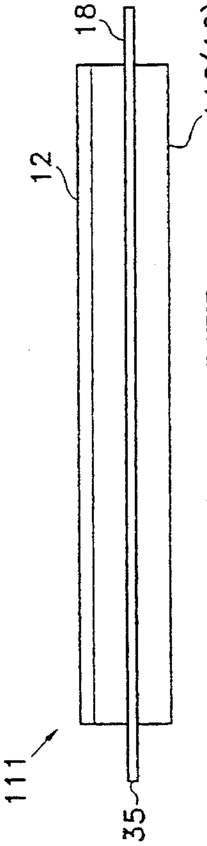
Figure 7X:
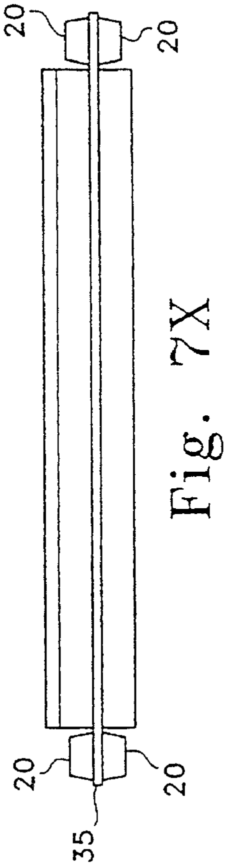

FIG. 7, comprising FIGS. 7A through 7X, gives a schematic illustration of the process and formation of the multilayer grid structure 35 and of the cathode and anode and the ultimate assembly of these components.

FIG. 7A indicates one of the sheets of unfired blank glass-ceramic tape 90. In FIG. 7B the punching of via holes 92 is indicated through one or more layers of the glass ceramic material 90, and this hole forming operation can be performed in accordance with a process of the invention described below with reference to FIG. 9. The via holes are distinguished from the electron addressing holes, preferably formed at a different stage. Via holes are formed in margin area 18 and may be formed between pixel holes so as to permit interconnection of traces between layers (discussed further with reference to FIG. 20, below).

FIG. 7C indicates filling of the via holes with conductive material, forming conductive vias 94. In accordance with a preferred embodiment of the invention, the via filling is accomplished by screen printing (or other types of printing) of the conductive material into the via holes, in the known manner used for multilayer ceramic circuits. This can be done, for example, using DuPont's 6141D via filling paste.

In FIG. 7D the depositing of the conductive traces 96 on one sheet 90 of glass-ceramic material is indicated. The trace material specified for DuPont Green type is 6142D. This is also preferably accomplished by screen printing techniques, although other types of printing may be used. A drying step may follow wherein the layers are heated sufficiently to remove the volatiles from the inks of the conductive traces. The conductive traces 96 (which will lie in different directions on different sheets of the material) are positioned in paths where the pixel holes will be located. The conductive vias 94 may also have conductive traces deposited over them on some layers. As indicated, the conductive vias 94 are located in areas outside the viewing area, i.e. outside the area having the pixel holes (although in another embodiment described below, the vias are formed between and among the pixel addressing holes so as to leave the peripheral areas free for joining screen sections modularly.)

FIG. 7E indicates the step of forming the multiplicity of pixel holes 44 in the sheet 90 of unfired glass-ceramic material. As with the via holes 92 (FIG. 7B), this grid of very small holes may advantageously be formed in accordance with a hole-blowing process described below with reference to FIG. 9.

In FIG. 7F the series of layers 90 including layers 90*a*, 90*b*, 90*c*, 90*d*, 90*e* have been stacked and laminated together. The pixel holes 44 have been formed identically in each layer, so that they are in good registry in the resulting stack 90*x*. Lamination may be accomplished at this stage by a low temperature heat application, such as at about 70° C. between hot platens, with pressure. This low heat is sufficient to fuse the plasticizers together between layers, so that the layers are bound together by the plasticizers. FIG. 7F indicates conductive traces 96 running in the horizontal direction. Other traces 96*a*, 96*b*, 96*c* are indicated below, by successively cutaway layers at the lower left.

FIG. 7G represents another step according to a specific embodiment of the invention, whereby the multiplicity of holes 44, laid together in registry in the laminated stack of layers 90*x*, are treated with a flow-through of abrasive-containing fluid, preferably liquid (for example, water containing silicon carbide sub-mil particles). This operation is conducted with a pair of opposed die plates supporting the laminated structure as explained below with reference to FIG. 9. The pumping of abrasive-containing liquid through the pattern of holes, with the die plates on either side to channel the flow, effectively reams all the holes to be sure they are the correct size and shape as desired, correcting any minor irregularities in registry among the layers, which are still plastic and unfired.

In FIG. 7H the laminated structure is fired, in a stepped or profile firing. This may be at an initial temperature of about 350° C., in which the organics are burned out, increased in a prescribed profiling mode up to about 950° C., depending on the materials.

As described above with reference to FIGS. 1, 2 and 6 in particular, the addressing grid must be supported at front and back (except for small screen embodiments), as by front supports 42 and back supports 51 engaged between the addressing grid structure 35 and the face plate 12 or the back plate 16, respectively.

In regard to spacing support between the addressing grid and the anode or face plate, a variety of techniques may be used. One method is to use a layer of photoreactive glass material which is much thicker than the addressing grid structure 35 (several layers may be used). The addressing grid 35 can be used as a mask for exposure of the photoreactive layers, with the UV light preferably forming into a controlled diverging cone in the glass as projected through each grid hole. A thermal step may then be required to make the exposed volumes acid-etchable. The layer is then acid-etched to remove material at all areas except between addressing grid holes and therefore between pixel dots, where support is desired. The resulting spacer support is then thermally processed to enhance its strength.

Another method for forming the front side supports or spacers again involves use of the addressing grid structure as a photo mask. Unfired glass ceramic tape can be used, in one thick layer or a series of stacked layers, the tape being formulated with a photolithographic characteristic. The photo sensitive glass ceramic tape is translucent and nearly transparent, such that the appropriate reactive light (such as ultraviolet) can pass through the spacer layer (or a series of layers separately) in the plastic, unfired state. The light is passed through the unfired addressing grid structure (following the step of FIG. 7G, above) and into the spacer material. In this case the plastic binder in the glass ceramic material changes by exposure to light, changing so as to allow it to be removed. Once exposed to the appropriate light, the disks or cone-shaped volumes within the plastic spacer material, unlike the remainder of the spacer material, can be removed by attacking the plastic binder material with an appropriate acid or solvent. The glass and/or ceramic particles wash away with the removal of the binder. After this operation, the unfired, plastic perforated spacer sheet (or sheets) can be put together with the glass ceramic grid itself, and fired together as in the step of FIG. 7H.

Another procedure which can be used for the front spacers or spacer sheet is the earlier described process of blowing out holes through unfired glass ceramic tape. As an example, five sheets of unfired tape, each approximately 0.030 inch thick, can be blown out by fluid pressure using an appropriate pair of dies as described above. Instead of forming an individual hole to correspond to each addressing grid hole, larger holes can be formed, such as for a triad of phosphor dots, i.e. one for each pixel of holes on the addressing grid. In this way the aspect ratio of material thickness to hole diameter or width can be maintained, for efficient formation of the holes with the fluid pressure process. As above, the openings in the spacer sheets can be cleaned out and reamed to the correct size and shape using an abrasive liquid pumped through the holes of the spacer sheet between the dies.

A still further procedure which can be used to form the front spacer structure again involves use of the addressing grid structure. In a procedure which uses some of the principles of a procedure for rapid prototyping, the perforated addressing grid structure may be placed at the surface of a pool of liquid, front surface down. The liquid is comprised of ultraviolet curable polymers, and its depth, i.e. the depth from the face of the addressing grid to the bottom of the pool, is the depth desired for the spacer sheet. Ultraviolet light is directed through the addressing grid holes and down into the liquid, in a manner to establish a controlled divergence of the light through the depth of the liquid. The liquid is not purely transmissive, helping to scatter the light into generally a cone shape. The result of the light exposure step is to cure the top surface of the liquid (in the event it extends slightly above the addressing grid), as well as through all of the desired hole locations and in the desired generally conical diverging shape beyond the holes. One advantage of the UV curable liquids (such as that manufactured by UVEXS, Inc. of Sunnyvale, Calif.), is that no volatiles are included in the liquid material, and thus the material does not dry on exposure to air.

With the desired regions cured, the addressing grid structure is removed from the liquid bath and inverted, thus establishing a mold which can be used to produce the desired spacer sheet. A castable glass-ceramic material, i.e. unfired glass ceramic material formulated into a castable form, is vacuum cast on the surface of the addressing grid, to a depth extending to the tips of the fine, filament-like posts (each, for example, about 4–8 mils in diameter at its upper end). The cast material, which will become the spacer sheet, sets up and then can be put in the furnace with the addressing grid and fired together with the grid. The cast ceramic sheet cures and its binders are burned out, shrinking to the same extent as the addressing grid (unless non-shrink ceramics are used), and the plastic filaments or columns extending through and up from the addressing grid holes are burned out.

After the stepped or profile firing step indicated in FIG. 7H (which may include firing of a spacer structure in combination with the grid), the amorphous glass in the glass-ceramic layers has fused together between layers, permanently bonding the layers into an integral, layered laminate with the conductive traces between layers and, if desired, also on one or both of the exposed front and back surfaces. If all of the conductive traces are below the surface, they are brought to the surface by the conductive vias 94, or in an alternate configuration not illustrated, the different layers can extend in stepped fashion laterally out from the seal, so that contacts associated with the conductive traces are exposed serially by layer in this way. However, the preferred embodiment is to bring all the leads to integrated circuits mounted as shown schematically in FIG. 1. This advantageously utilizes the properties for which low temperature cofired ceramic tape was developed (for example, those properties listed in the Summary, above) and eliminates the need and associated costs inherent with using connectors and mounting the drive circuits remote from the display.

FIG. 7I indicates the application of solder glass 98 (similar to an ink or paint) to the front and back surfaces in a peripheral rectangular pattern at the location of the seal area 14 shown in FIG. 1. After application, the solder glass is pre-glazed (as also indicated in FIG. 7I) by heating the laminated structure to a temperature high enough to burn off the binders and fuse the glass particles together, but low enough not to cause divitrification (for solder glass that devitrifies). This preglaze temperature is generally between 400° C. to 600° C. depending on the binder and solder glass used (see steps listed in Table III below for a preferred embodiment). Preglazing ensures that the binders, including organics, are cleanly burned away before the tube is sealed. This is particularly important in a high internal structure surface area to internal vacuum volume tube such as described herein, to avoid contaminants. Without preglazing, tube contamination can occur in either air or vacuum final seal due to a lack of sufficient oxygen to completely burn away the binder.

Other sealing techniques involve laser welding of metal flanges or laser welding of glass ceramic materials.

The addressing grid **90*x*, which may have integral supports as described above, will now be identified as the grid 35** as noted in other drawings.

FIGS. 7J through 7N indicate schematically the production of the cathode assembly, which will be assembled to the multilayer addressing grid and to the anode assembly. In these figures and this discussion it is assumed that a thermionic or "hot" cathode is used. However, the cathode may be an appropriate form of cold cathode (field emitter device, FED).

FIG. 7J indicates the formation of a crenulated back plate **16*b* which will support the cathode and which will become the back plate 16 of the assembly. The sheet 16*b*** is rigid, for example, a glass plate or a ceramic plate which has been fired (although metal alloys can be used matching the thermal coefficient of the addressing grid).

The back plate **16*b* (16) and its support against the addressing grid, with the cathode structure between, can be formed in several different ways. As one example, the back plate can be formed of the same green tape glass ceramic material as the addressing grid as described above. In this case the supports for contact with the addressing grid can be formed into the surface of the green glass ceramic material in a crenulated configuration, leaving troughs or rows of recesses within which thermionic cathode wires can be positioned, as shown in FIGS. 2 and 6. Such forming of the green tape surface can be by molding or stamping techniques. It is important that the supports be precisely positioned and of controlled and narrow dimension, since each support will form a line (or series of columns) which must contact the addressing grid between addressing holes. One method for achieving such precision in cathode troughs and in supports produces a result which is generally illustrated in FIG. 2. By one procedure the back supports 80 are formed integrally in the front surface of the back plate 16**, by molding of the unfired glass ceramic material using an appropriately formed mold. The shape of the troughs is cylindrical, but in other embodiments may be made non-cylindrical.

As shown in FIG. 2, a single cathode wire 26 can extend longitudinally through each trough formed by this method. Spacing from trough to trough can be about 200 mils, and 16 addressing grid holes 44 can be adjacent to each cathode trough.

Alternative methods of forming the back plate supports 80 may be used, such as deposition of vacuum compatible materials on the back plate before or after firing, interposition of a vacuum compatible spacer web between the back plate and the addressing grid upon assembly, or other suitable techniques.

Another form of back plate can again be a glass ceramic plate, but without supports, the supports being formed on the back surface of the addressing grid. In another arrangement the back plate can be a sheet of glass, and the supports can either be formed on the back surface of the addressing grid or deposited by a suitable process on the glass backed plate.

FIG. 7K indicates firing of the solder glass 98 on the sheet of material **16*b***, which may be at about 400° to 600° C. as above.

In FIG. 7L the attachment of a cathode frame 100 is indicated. The cathode frame preferably comprises a conductive metal strip at top and bottom to which all cathode wires are secured; one or both sides preferably have spring strips (not shown) to which the cathode wire ends are secured so as to maintain tension in the wires through thermal changes. The spring strips in one preferred embodiment comprise chemical milled strips in a frame formed of a metal which will maintain its springy characteristic even at high temperature, for example Hastalloy B.

FIG. 7M shows a wire cathode 22, having been secured via the cathode frame 100.

To reduce the effects of the voltage drop along the cathode wires when the cathode wires run perpendicular to the rows (as in the described embodiment) the voltage applied to the cathode wires can vary in time so that the voltage of the cathode wire adjacent to the row being addressed is near ground potential.

To reduce the power required to operate the tube, the cathode wires can be run parallel to the rows and the cathode cycled on only as needed during row addressing. This approach will require that the cathode supports be electrically isolated from each other so that the cathodes can be turned on in synchronization with the row addressing.

In FIG. 7N the cathode wires 22 are indicated as being coated with tricarbonate, a conventional procedure which may be accomplished by electrophoresis. Spraying is an alternative process. By this process, carbonates of several metals such as strontium, calcium and barium are coated onto a tungsten wire (which may be thoriated as in the known process). In a later bakeout step under vacuum, the carbonates deposited on the cathode filaments are converted to oxides and all binding material is removed, a process well known in the industry. These steps assure that the assembled tube will have a clean cathode. Alternatively, bicarbonate mixes also give acceptable performance later forming a useful and efficient oxide cathode. This completes the back plate/cathode assembly.

FIG. 7N' shows the frame 100 with the cathode 22 removed from the back plate **16*b***, in exploded view for clarity (not indicating order of assembly).

FIGS. 7P through 7S relate to production of the anode assembly. To a sheet of glass 104 is applied a rectangular band of solder glass 98 (or the assembly may use a sheet of glass-ceramic material as described above, with glass dots embedded in holes).

In FIG. 7Q is indicated the firing of the solder glass 98 to a preglaze state.

FIG. 7R indicates the phosphor application process to the face plate 104. The phosphor dots, including discrete color dots for each pixel, are preferably applied to the glass in a manner generally used for conventional video tubes such as the "photo-tacky" process. Photo-tacky is a process wherein a layer of material becomes tacky for a limited time when exposed to light. The phosphor powder is dusted onto the material and only sticks where the material is tacky. In lieu of R, G and B phosphor dots for each pixel, R, G and B phosphor stripes may be applied, in a known conventional manner. Use of a flat glass face plate allows the use of alternate methods such as offset printing to apply the phosphor material. The phosphor is generally indicated as 106 in FIG. 7R.

FIG. 7S indicates aluminizing of the anode, i.e. covering the phosphor with a thin layer of aluminum 108, to protect and maintain the integrity of the phosphor dots and to increase the tube brightness by redirecting some of the reardirected photons toward the viewer. With aluminization, electrons must have a threshold level of energy to pierce the aluminum and excite the phosphor. This completes production of the anode/face plate 12.

Figure 7T:
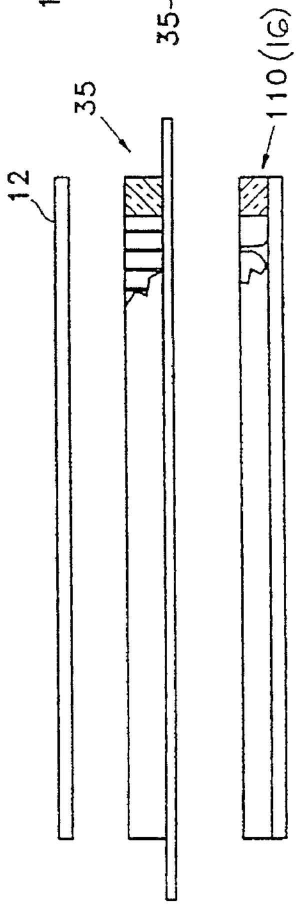
Figure 7U:
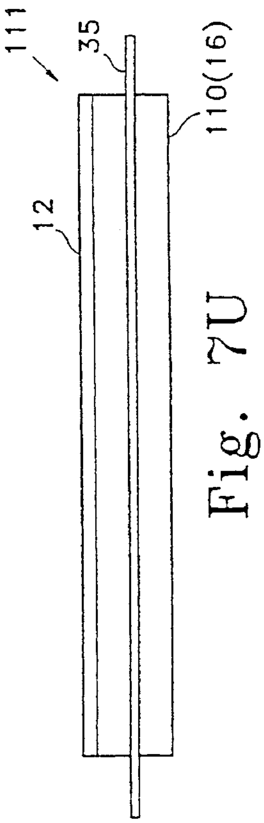

FIGS. 7T through 7X indicate steps in assembly of the three components together: the back plate/cathode assembly 110, the multilayer addressing grid structure 35 and the anode assembly 12. The preferred embodiment is carried out entirely in vacuum. FIG. 7T indicates bakeout of the three components under vacuum, and FIG. 7U shows the lamination/assembly of the three components together, producing an assembly 111. In the preferred embodiment the tube is baked out unassembled because the high internal structure surface area as compared to internal tube volume makes conventional tabulation pumpout impractically long in production.

Figure 7V:
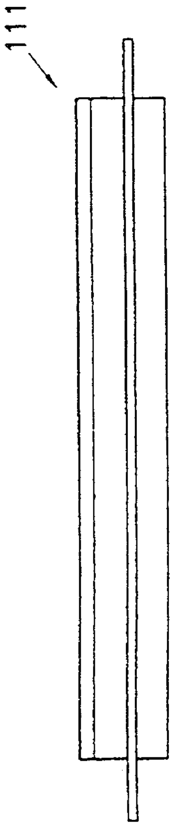

In FIG. 7V the assembly is heated to the extent that the solder glass seals soften and fuse together, typically at 450° C. for certain types of solder glass, and at times as prescribed in the material specification. Solder glass preglazing and sealing temperatures and times are generally specified by the glass manufacturer or are determined by the user using techniques known to those skilled in the art. Table III below gives an example for a preferred embodiment.

FIG. 7W indicates one or more getters being processed. For example, if a flashed getter is used, a thin film or strip of metal (having an affinity for oxygen) is heated by electrical resistance and plated against appropriate surfaces inside the tube, such as in one or more peripheral areas of the glass ceramic grid plate, outside the active addressing area. Active getters can also be used, wherein the getters act as vacuum ion pumps, active whenever the tube is powered.

Finally, FIG. 7X indicates connection of the ASIC drivers 20 to the finished addressing grid structure 35, which extends outwardly from the cathode/back plate assembly 110 (16) and the anode assembly 12. This involves making electrical contact between the ASIC drivers 20 and the conductive traces, vias or busses extending along the surfaces of the peripheral areas 18 of the addressing grid structure 35.

Although FIGS. 7A–7X illustrate the preferred embodiment, alternative embodiments both laminate and fire the addressing grid before forming the addressing holes (as distinguished from the via holes). Holes can then be formed by laser abrasive water jet or other drilling process, although these processee are considered less practical because of time requirements.

The following table outlines the processes depicted in FIGS. 7A through 7X and gives times, temperatures and materials for certain of the fabrication steps outlined in those figures. Most of these steps are described elsewhere in the specification in conjunction with the description of the relevant figure.

TABLE III

| FIG. Number | Step Description | Process and Materials |
|---|---|---|
| | | Grid Assembly |
| 7A | Blank Tape for Grid | Blank Ceramic tape per material specification. |
| 7B | Via Holes | Form via holes per hole blowing technique described herein or per material specifications. |
| 7C | Fill Via Holes | Print (screen or other technique) via filling paste in via holes, per material specifications. |
| 7D | Conductive Traces | Print conductive traces, per material specifications. |
| 7E | Holes for Pixels | Form holes for pixels (see description of FIG. 9). |
| 7F | Laminate Stacked Green Tape Layers | 70° C. @ 3000–4000 psi for 10 minutes, (rotate part 180° half way thru lamination). |
| 7G | Clear Holes with Abrasive Fluid | Pump Water with 1 um SiC particles in suspension at 200 psi until clear (1–2 minutes). |
| 7H | Profile (Step) Firing | Firing schedule for 7 layer 2" test samples<br>1. Room temperature (RT to 350° C. at 10° C./min.<br>2. 350° C. for 55 min. (binder burn-out)<br>3. 350° C. to 860° C. at 10° C./min<br>4. 860° C. for 13.0 min.<br>5. 860° C. to 840° C. at 10° C./min.<br>Note: Total time above 840° C. must not exceed 18 min. per material specification.<br>6. 840° C. to 500° C. at 6.5° C./min.<br>7. 500° C. to RT at 6.5° C./min. or less.<br>All temperatures are ±5° C., all ramps are ±10%.<br>Firing schedule for larger parts will differ from the above schedule as follows:<br>Larger and thicker parts need slower ramp up times and longer binder burn-out times (these times must be determined for each specific part). |
| 7I | Apply Solder Glass | 1. Screen print X-1175 (Owens-NEG) solder glass (−325 mesh) onto parts to be joined; anode, grid (both sides), and cathode.<br>2. Dry at 100° C. with IR lamp for 30 min.<br>3. Repeat process until a .004 in layer is built up. |
| 7I | Pre-glaze Solder Glass | 1. Place part on grate of traveling grate furnace or batch air oven and raise to 350° C. at 5° C./min.<br>2. 350° C. for 30 min. (Binder burn-out).<br>3. 350° C. to 500° C. at 5° C./min.<br>4. 500° C. for 10 min. (To remove bubbles from the glazed part. Repeat as necessary to eliminate all bubbles visible under 10× microscope.).<br>5. Repeat step 4 under vacuum remove all dissolved gases. |
| | | Cathode Assembly |
| 7J | Cathode Back Plate | Form crenulated cathode back plate by casting, molding, stamping or machining. |
| 7K | Apply, Pre-glaze Solder Glass | (See 7I, above) |
| 7L | Cathode Frame | Attach cathode frame to cathode back plate. |
| 7M | Wire Cathode | Attach cathode wires to cathode frame. |
| 7N | Tricarbonate on Cathode | Electrophoresis (or other deposition) of tricarbonate or bicarbonate onto cathode wires. |
| | | Anode Assembly |
| 7P | Apply Solder Glass | Apply solder glass to seal area on face plate (See 7I, above). |
| 7Q | Pre-glaze Solder Glass | (See 7I, above). |
| 7R | Apply Phosphors | Deposit (by screen printing, or other photolithographic technique) phosphors for pixel dots on anode side of face plate. |
| 7S | Aluminize Screen | Cover phosphor with then layer of aluminum. |
| | | Assembly |
| 7T | Jig Assemble | Assemble cathode, grid and anode with suitable jigs, fixtures, holding parts to be joined apart. |
| 7T | Form Cathode | 1. Place part in a vacuum furnace.<br>2. Pump vacuum station to 5 × $10^{-7}$ T.<br>3. RT to 300° C. at 5° C./min.<br>4. Apply 1/10 of cathode operating voltage in step fashion. Allow the vacuum pressure to stabilize for 2 min. before advancing to the next voltage step.<br>5. At .6 of the cathode operating voltage hold for 10 min. until color stabilizes.<br>6. Advance voltage in steps of 1/10 of cathode operating voltage up to the cathode operating voltage. Allow the color and vacuum to stabilize before advancing to the next voltage step.<br>7. Turn off power to cathode. |
| 7T | Vacuum Bake-Out | 1. Outgas tube at 300° C. until pressure stabilized at 1 × $10^{-6}$ T.<br>2. Continue to outgas for 1 hour. |
| 7U | Assemble Tube | Bring together the cathode/ |

TABLE III-continued

| FIG. Number | Step Description | Process and Materials |
|---|---|---|
| | | back plate assembly, the addressing grid and the anode/face plate for joining. |
| 7V | Seal Solder Glass | 1. 300° C. to 475° C. at 5° C./min.<br>2. 475° C. for 15 min.<br>3. 475° C. to 300° C. at 5° C./min.<br>4. 300° C. for 15 min. (annealing)<br>5. 300° C. to RT at 5° C./min. |
| 7W | Proces Getter | Process flash getter by application of prescribed voltage. |
| 7X | Attach ASICs | Connect ASIC drivers to completed grid structure, with electrical contact to conductive traces, vias and busses. |

Shrinkage uniformity is important in producing an addressing structure and in producing an assembled CRT which is accurate and functions properly. In particular, the positions of the pixel holes must be sufficiently predictable and accurate that each hole will be in registry with and will address the appropriate phosphor dot. Most ceramic tapes exhibit some nonuniformity in shrinkage, but glass ceramic tape systems have been developed having high shrinkage and zero x-y shrinkage. Material such as DuPont 851U Green Tape has a shrinkage of 12% in x and y and 17% in z. If pressure is applied in z during firing then the x-y shrinkage can be reduced to zero while increasing the z shrinkage. Shrinkage uniformity is the variation of the shrinkage from nominal shrinkage during the firing process. Shrinkage uniformity is defined as the change or variation in shrinkage from the nominal value. Thus 0.2% shrinkage uniformity about a nominal 12% shrinkage would result in the part shrinking to anywhere from 87.8% to 88.2% of its original size. Thus two holes 10 inches apart in the unfired state could be located anywhere from 8.820 inches to 8.780 inches apart after firing. For 0.01% shrinkage uniformity the range for the same example would be 8.801 inches to 8.799 inches. In high shrinkage material, such as DuPont 851U, the nominal shrinkage uniformity is 0.2%. For certain display applications such as VGA or SGVA variations of this amount would not allow the grid pixel holes to align with independently formed phosphor dots. The preferred embodiment is to reduce the shrinkage to thereby reduce the shrinkage variation. The desired shrinkage uniformity is 0.04% for VGA level resolution and 0.025% for SGVA resolution. By reducing the shrinkage to near zero, the shrinkage uniformity can be improved, using materials that utilize compression during firing to control shrinkage. For higher resolutions than can be maintained with available materials or processes each grid can be used as its own mask for photo-lithographic application of the phosphor dots, thereby eliminating any misalignment between the individual pixel holes in the grid and the corresponding phosphor dot.

Figure 8A:
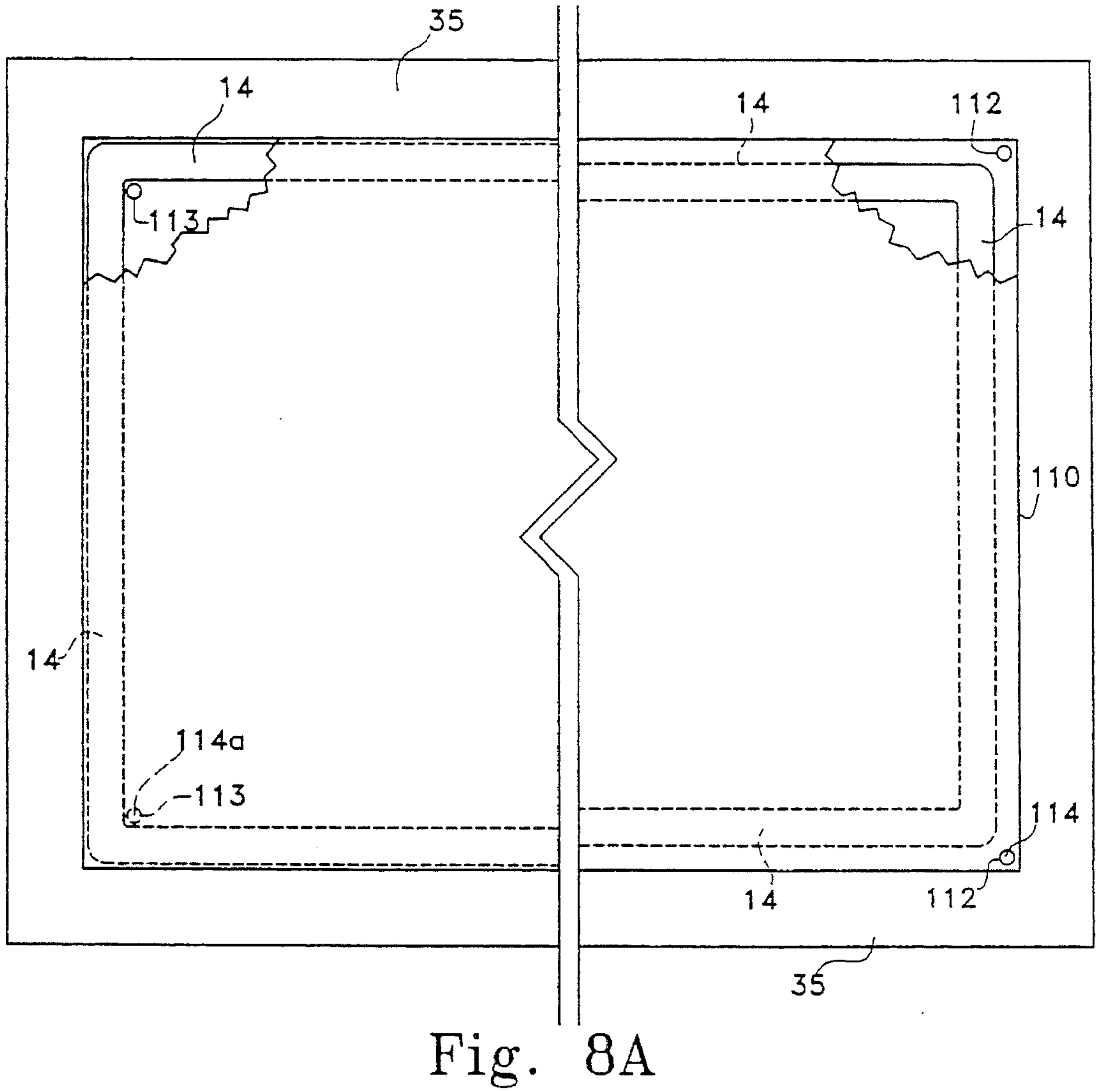
FIGS. 8A and 8B schematically indicate the use of pins for alignment and registry of the anode or face plate, the addressing grid and the back plate upon assembly of the flat screen CRT.
Figure 8B:
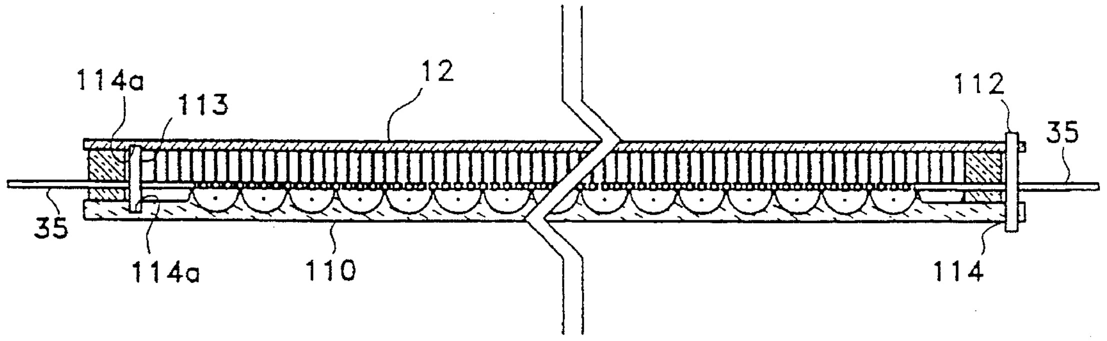

FIGS. 8A and 8B relate to assembly of the three main components of the cathode ray tube 10, i.e. the face plate or anode 12, the addressing grid structure 35 and back plate/cathode 110. These figures illustrate the use of alignment or registry pins 113 or 112 in holes 114, to assure proper registry of the three components upon assembly. FIG. 8A is a plan view, while FIG. 8B is a sectional view, both being schematic representations not showing all components.

FIGS. 8A and 8B show two different alternatives. On the left of each figure a registry pin 113 passes through a closely sized hole in the addressing grid, but into recesses **114*a* in the anode plate and back plate as shown, without passing through to the front and back (the back plate/cathode assembly is shown broken away at two corners in FIG. 8A). The pins 113 are thus captured in and retained within the assembly. In this case the seal 14 may be positioned outside the location of the pins 113, as shown. On the other hand, on the right side of the drawings the pin 112 passes through registry holes 114 in all three components, with the pin to be removed after the assembly is complete. In this case the pins 112 are positioned outside the seal 14, since the registry holes 114** pass through the entire assembly.

Figure 9:
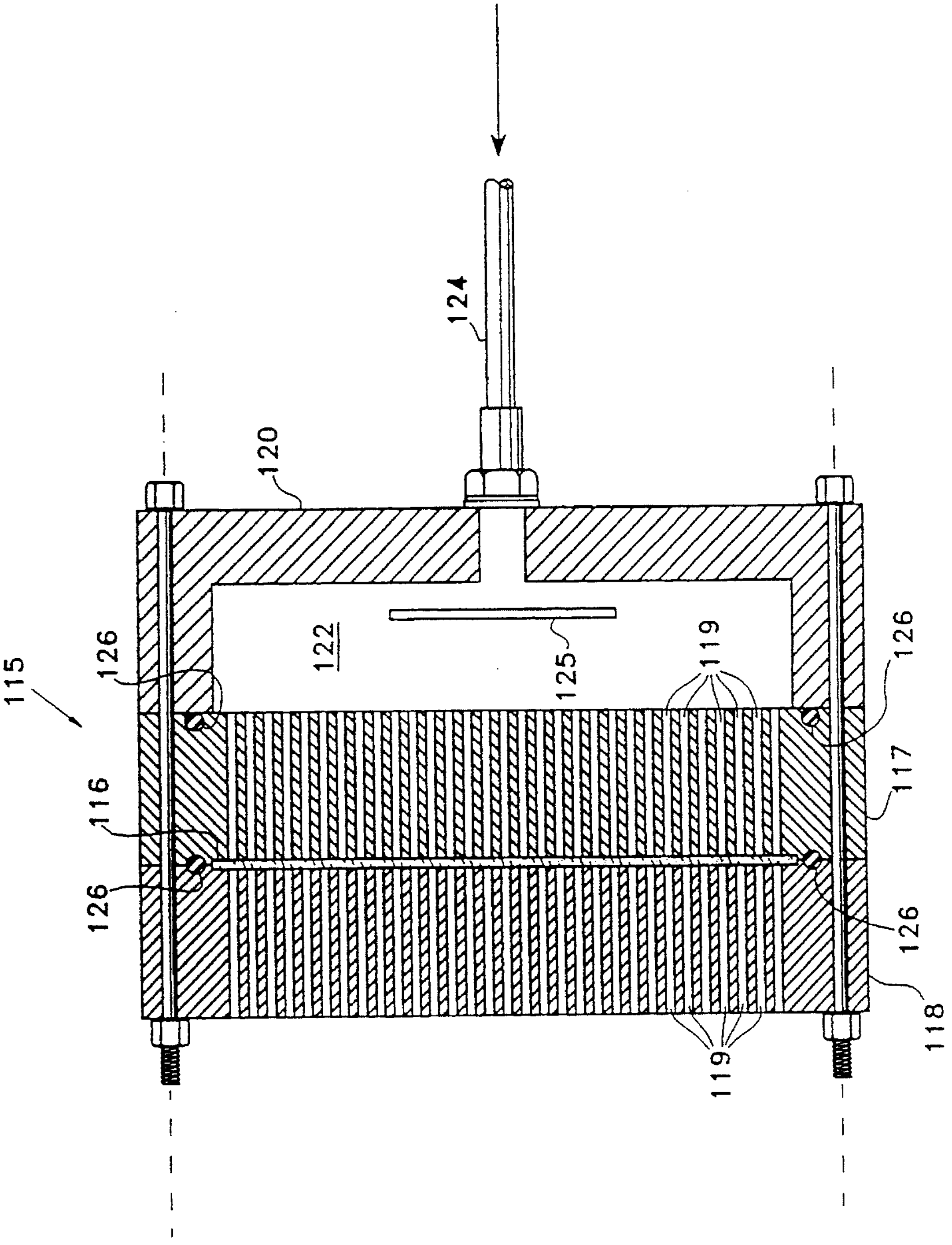
FIG. 9 is a sectional view illustrating a device for forming holes in unfired glass ceramic sheets by use of fluid pressure through a die.

FIG. 9 is a sectional view indicating a method and a die for creating the multiplicity of addressing grid holes 44 in each sheet of unfired glass ceramic material. The die, generally indicated at 115, uses fluid pressure to blow holes through the unfired, flexible glass-ceramic material of the sheets, such as indicated in FIG. 7E. A sheet of the material is placed at a location indicated as 116 in FIG. 9, preferably between a pair of matching dies 117 and 118, each of which has a pattern of a multiplicity of bores 119, corresponding to the desired location of the pixel holes 44 for each sheet or layer of the addressing grid. In another embodiment only the back die 118 is used with somewhat reduced hole quality depending on tape thickness, hole size, aspect ratio, etc. A pressure chamber head 120 has a fluid plenum 122 which receives fluid pressure through a pressure inlet conduit 124, as schematically indicated in the figure. Preferably a baffle plate or other appropriate gas-dispersing structure 125 is located between the fluid inlet and the bores 119, as shown. The pressure plenum 122 is sealed against the face of the first die 117, as by an O-ring peripheral seal 126.

With the sheet of glass ceramic material clamped tightly between the dies 117 and 118 in this assembly, a sudden pulse of high pressure air, other gas or liquid is forced through the bores 119 via the plenum 122, blowing out plugs of the glass ceramic material in the desired locations for the pixel holes. The pixel holes in one specific embodiment are, for example, 4 mils in diameter and on 13.3 mil pixel triad centers. They may be in a close-packed hexagonal pattern as discussed above, or a linear array of holes, slots or other shapes as desired for specific embodiments.

The thickness of the sheet of green unfired ceramic material, and especially the ratio between this thickness and the hole diameter, is an important consideration in determining the pressure necessary for forming the holes. As this thickness/diameter ratio increases, the necessary pressure rises greatly. This is also determined in part by the density of the fluid employed. Heavy gas will generally work more effectively than light gas, and liquid, with its incompressibility, can be even more effective. Experimentally it was determined, for example, that a 5 hole by 5 hole grid of 12 mil holes on 25 mil centers was easily achieved through a green glass ceramic material having a thickness of 5 mils, using helium gas at a pressure of 2000 psi.

This hole forming process can be enhanced by flash heating or exposing to chemicals such as MEK the glass ceramic material, only in the hole locations, prior to the pressure burst. The die can be used as a mask for this purpose. For example, accurate holes of 2 units have been produced through 5 mil tape using MEK. Such treatment imposed at the hole locations increases the thickness which can be punched by the hole forming process, and can enable a laminated stack of the unfired glass ceramic layers to form the holes through all layers together. The treatment reduces the pressure required to blow out the material and improves the quality of the fabricated hole.

It should be understood that the hole-forming die 115 need not be large enough to form the holes for the entire display area in one step. The sheet of glass ceramic material may be moved to a series of different locations, all properly registered as to location relative to the die assembly 115.

It has been observed that the class of materials preferred for this invention, generically referred to herein as ceramic tapes or glass ceramic tapes, have a tendency to be of greater density toward one surface than the other. This may be due to the typical formation process wherein a tape slurry is deposited onto a plastic sheet carrier and doctor-bladed into the desired thickness. This may also be due to asymmetric evaporation of volatile materials contained in the tape slurry, i.e. the volatiles can only exit from the upper surface. This movement of solvent through the tape may also transport binder to the top surface leaving the top portion of the tape binder rich. In any event, the tape material closest to the plastic sheet carrier tends to be of somewhat greater density. Recognizing this effect or characteristic of the tape material, it has been found advantageous to form the fluid-blown holes by placing the side of the tape produced on the carrier film against the upstream side of the blowing device.

In an alternative embodiment, the initial rough through holes can be formed by a gang-punching technique or other mechanical means, then later abrasively cleared with the layers stacked together as described above.

As explained above relative to FIG. 7G, once all of the glass ceramic sheets with the formed holes have been laid together in the laminate of FIG. 7F, a fluid abrasive slurry can be forced through the hole columns through the stack of layers. This is preferably accomplished by again using the hole blowing die 115. With the laminated and unfired glass ceramic structure clamped between die parts 117 and 118, a fluid/abrasive slurry flowing at high speed through the bores 119 will effectively ream out the holes to the full desired diameter, correcting slight errors in registry among the layers.

FIGS. 10 through 13 illustrate structures for implementing encoding schemes in accordance with the invention, for reducing the number of leads required to address particular pixel holes, for reducing the number of drivers and for addressing the holes by rows and columns. As explained above, conductive traces must be activated at all layers to cause electrons to pass through a particular pixel hole. ANDing of the layers enables the number of drivers to be greatly reduced.

Figure 10:
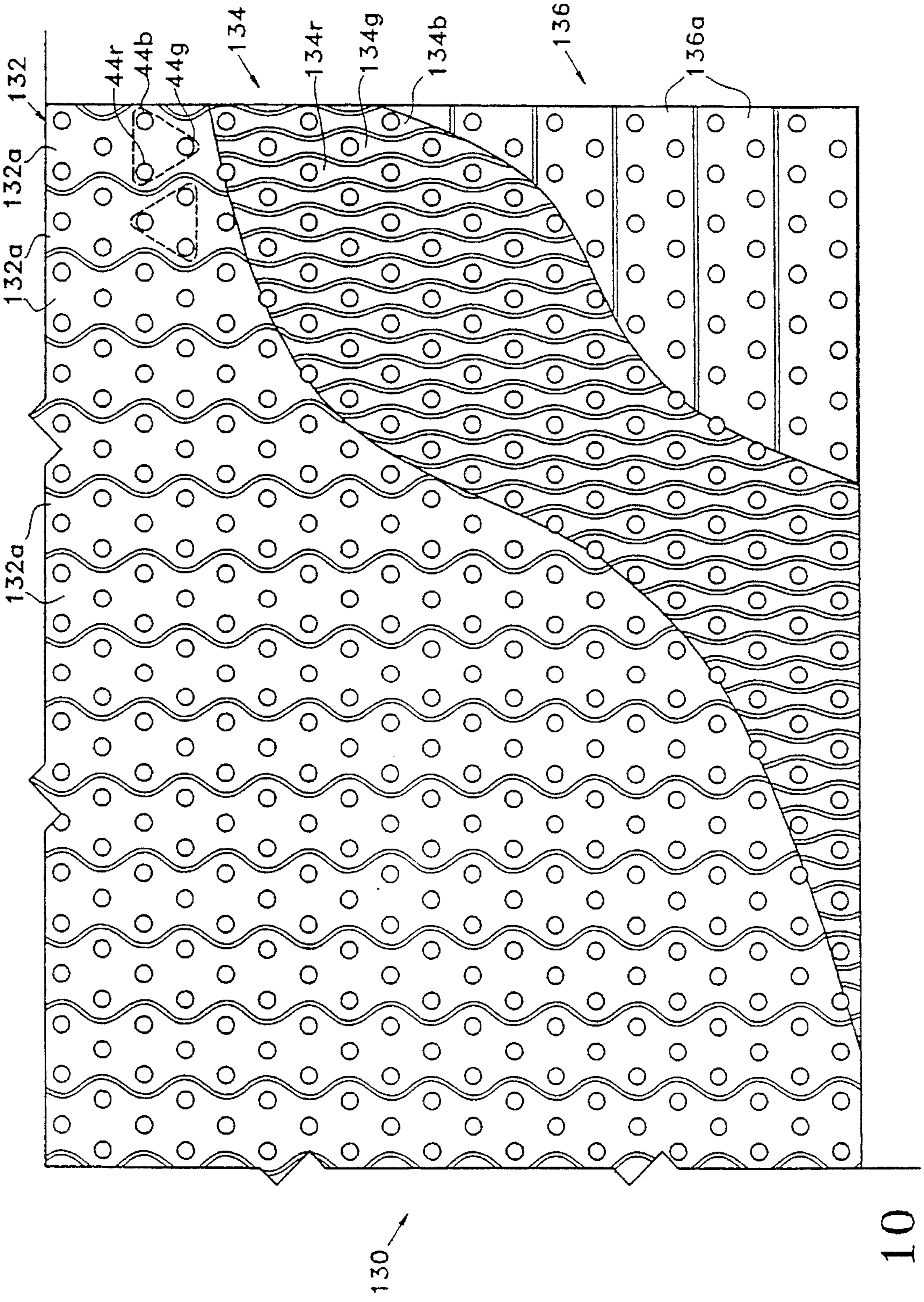
FIG. 10 is a schematic plan view illustrating electron addressing holes at different layers in a simplified addressing grid having the simplest form of encoding of addressing holes by rows, columns and color, with conductive traces surrounding the holes at different levels.

FIG. 10 shows a portion of a three-layer laminate 130, illustrating the simplest case for a color display, without group encoding of rows and with a conductive lead required for every column and every row. ANDing is used to the extent that pixel holes are addressed by rows and columns and by the particular color (R, G or B) which must also be active for a pixel to be addressed.

As shown in FIG. 10, three glass-ceramic layers are included in this sample embodiment, an upper layer 132, a middle layer 134 and a bottom layer 136. The upper layer 132 has conductive traces **132*a* positioned around columns of holes 44 as shown, with gaps 132*b* between the conductive trace columns. As illustrated, for this color display grid there are groups of three holes 44*r*, 44*g* and 44*b* function as pixel triads in each column (example triad indicated in dashed lines). Column data is applied to the conductive traces 132*a*,** preferably all columns simultaneously for a specific row, in the manner described above.

The bottom layer 136 has conductive traces **136*a*** to receive row data, each row comprising a row of pixels, i.e. a row of triads of holes. Row addressing simply comprises, in the addressing scheme contemplated herein, the selecting of each row individually and sequentially down the display, in a time-divided sequence.

Figure 13:
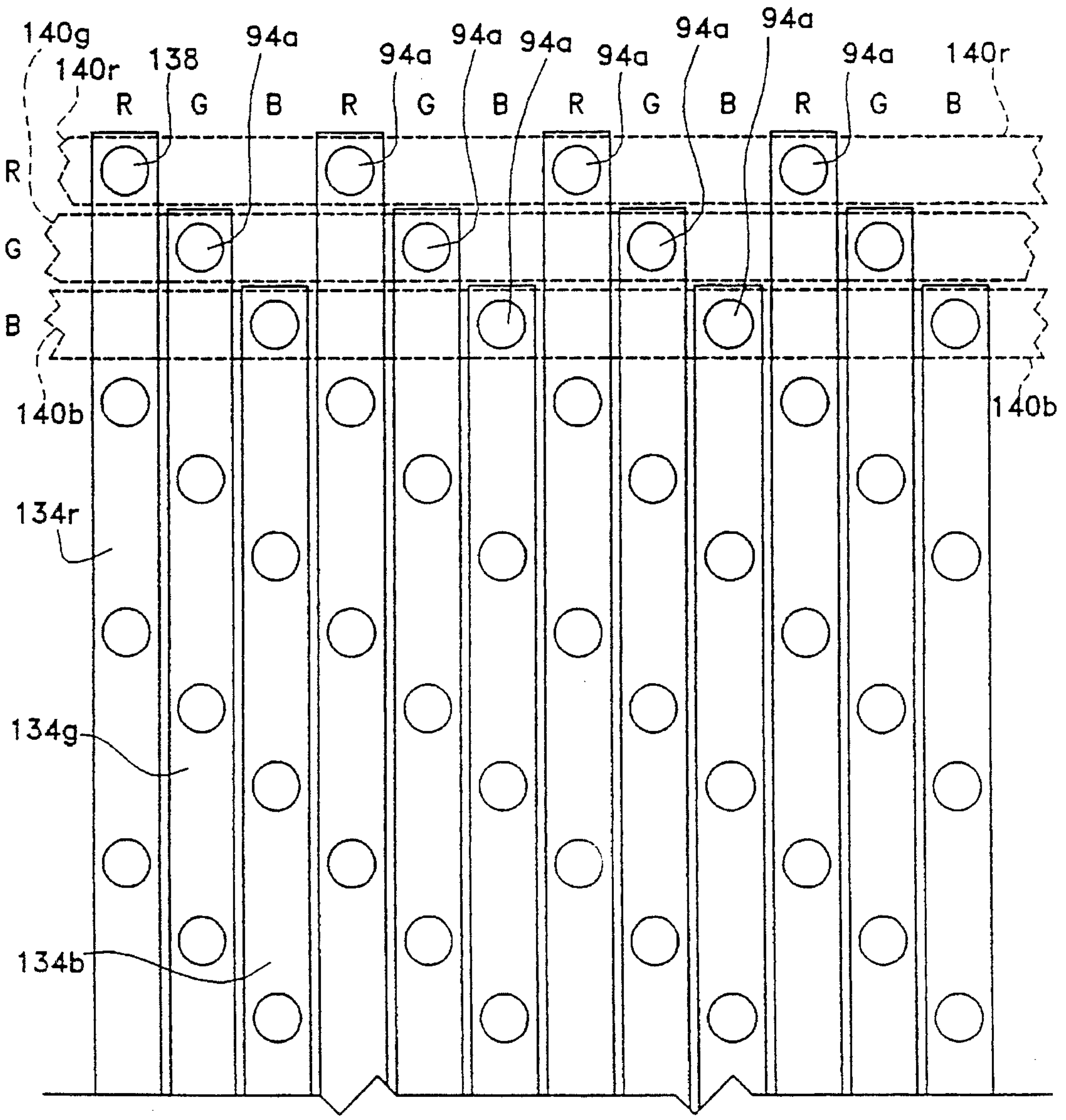
FIG. 13 is a schematic plan view illustrating an arrangement which can be used to interconnect all red pixel holes, all green pixel holes and all blue pixel holes for use in time division multiplexing of the three colors (or colors other than R, G and B if desired).

Thus, a pixel (comprising a triad of three pixel holes for color in this RGB embodiment) could be addressed uniquely by column and row. All pixels of one row can be addressed simultaneously, but with different data going to each column depending upon the input signal. To differentiate color, i.e. among the three color dots in each pixel, a preferred scheme according to the invention is to time division multiplex among R, G and B while addressing a particular row in the manner described earlier. This requires inclusion of the layer 134 in which the R, G and B holes are surrounded by conductive traces **134*r*, 134*g* i and 134*b* as subcolumns, with the conductive interconnection of all R subcolumns, separately all G subcolumns and separately all B subcolumns. FIG. 13 shows an arrangement for accomplishing this interconnection, using conductive vias 94*a* for interconnection of R subcolumns, with a conductive trace 140*r* serving as a connecting bar at a different level in the laminated assembly (the connective trace 140*r* could be on the same layer as the illustrated subcolumn traces for one color, since, as shown in FIG. 10, this will not involve crossing any other subcolumn traces). Similarly, all G subcolumn conductive traces can be connected by a conductive trace 140*g* at another level, and the B subcolumn conductive traces 134*b*, via a conductive trace 140*b* below. The connecting bars 140*r*, 140*g* and 140*b*** can all be at a single level and that level can of course be either above or below the location of the subcolumn conductive traces.

Thus, with the arrangement shown in FIGS. 10 and 13 only three leads are necessary from the color select layer 134 and one lead for each column on the column trace layer 132. However, on the row trace layer 136 in this simplified example a conductive lead is necessary for each individual row. Row encoding can reduce the number of leads by employing more layers as explained below.

It should also be understood that, if it is desired to maximize brightness in the display as discussed above, R data, G data and B data can be sent to the pixel holes simultaneously rather than by time division multiplexing. This will involve essentially eliminating the pixel column layer 132 and addressing the R, G and B subcolumns of the layer 134 individually, without connecting the colors together as in FIG. 13. Only the layers 134 and 136 are involved. Thus, the time duration of activation of each pixel hole is tripled, tripling brightness. However, the number of column leads is tripled, thereby tripling the number of drivers required since R, G and B data is being sent simultaneously.

Figure 12:
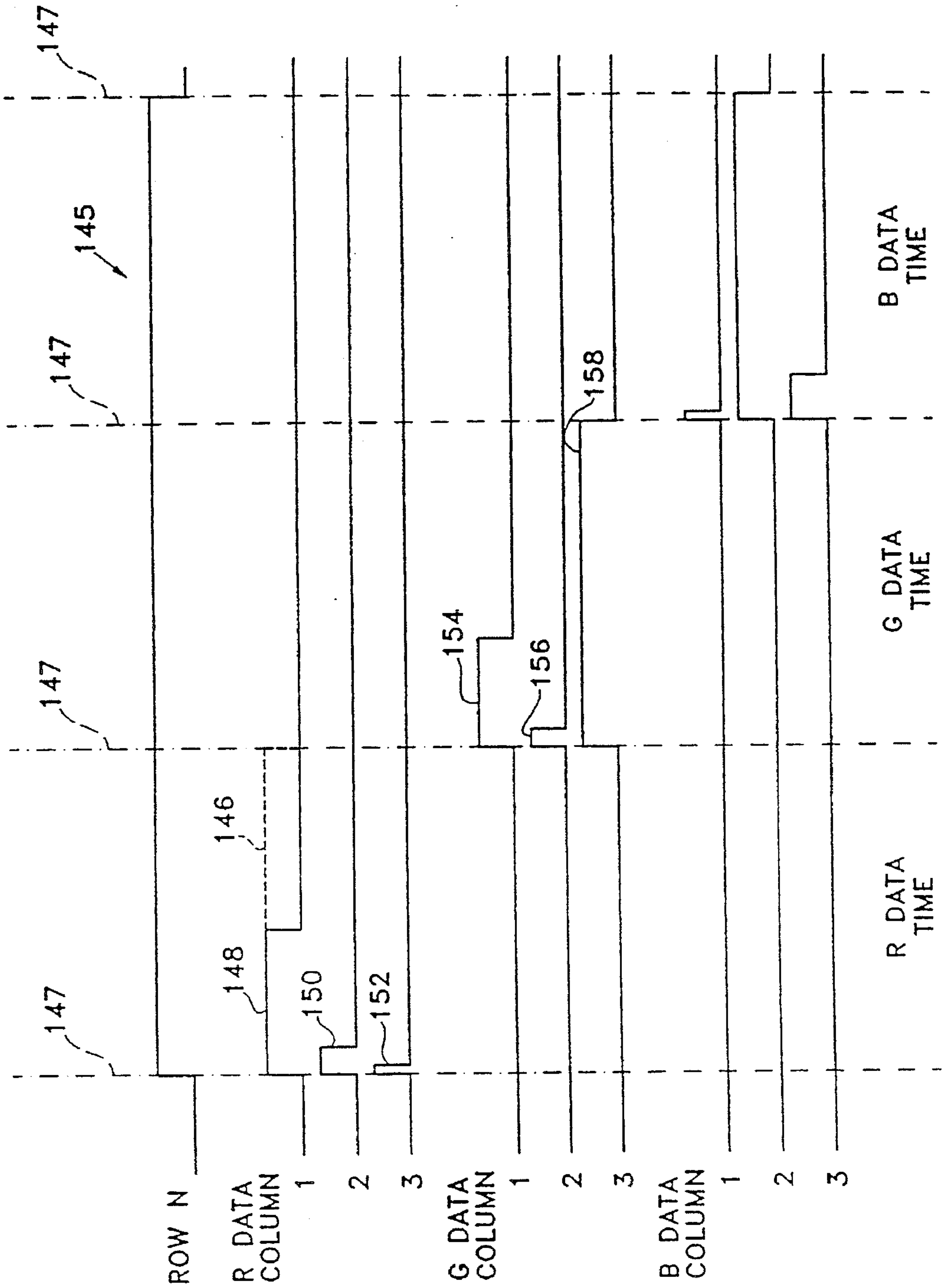
FIG. 12 is a schematic diagram illustrating color timing sequencing in accordance with one embodiment of the invention wherein time division multiplexing is used.

FIG. 12 is a simplified timing signal diagram for a color display addressing grid. The diagram indicates that the entire row, Row N in this example, is activated for certain unit of time (for example, 1/30 second). This interval is indicated at 145. The drawing indicates column data being applied, with time division between R, G and B data. Column data can be applied with R data from maximum potential interval 146 (dashed lines) which is equal to one-third of the total row interval 145. Dashed lines 147 show the division of the interval 145 into thirds. Examples are indicated in which, for columns 1, 2 and 3, R data is applied for respective intervals 148, 150 and 152. These intervals depend on the brightness specified for the R dot in each pixel of the row.

G column data is shown being applied for potentially the next one-third of the total row duration 145, with different G intervals 154, 156 and 158 being applied for the example pixels (columns) 1, 2 and 3. B data is applied for the remaining one-third of the row interval 145, in the manner described for R and G data.

Figure 11:
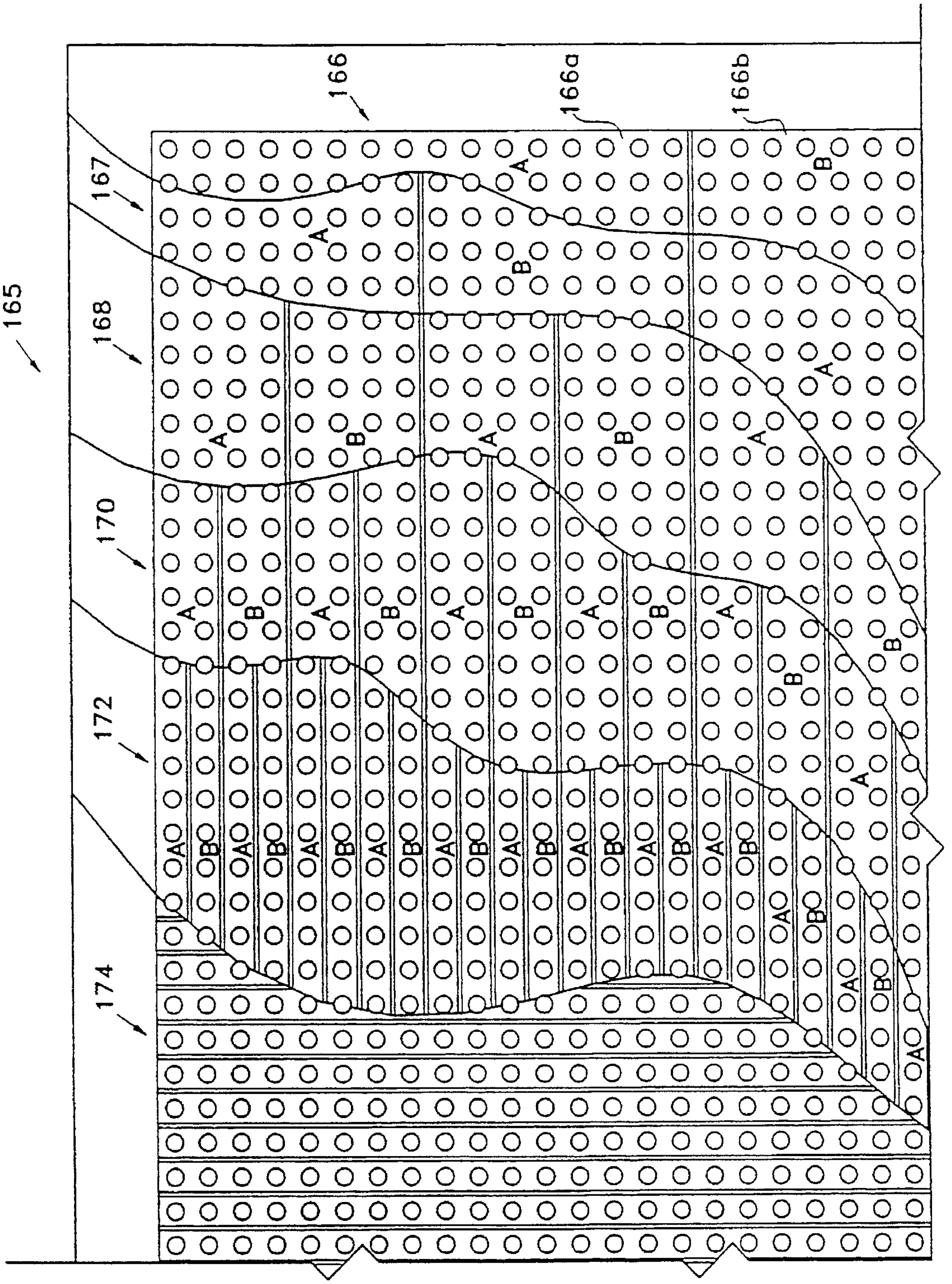
FIG. 11 is another schematic diagram showing a ceramic addressing grid formed of a stack of layers, with the layers serially broken away to show a system of encoding for a monochrome display.

FIG. 11 illustrates an example of row encoding. For the simplified situation of a monochrome display, binary encoding is advantageously employed; however, quaternary or octal or 16-division or higher encoding can be used to reduce the number of layers if desired.

In the monochrome addressing grid 165, columns of single-dot pixels are addressed individually. Column data could be encoded in a manner similar to the encoding of row data, but this would eliminate the ability to address all pixels in a row simultaneously.

Encoding is achieved by ANDing of a series of layers 166, 167, 168, 170, 172 and 174, the latter being the column data layer. In the binary encoding illustrated, a single conductive trace 166*a* surrounds all the A pixel holes on the layer 166 as shown, while a single conductive trace 166*b* surrounds all the pixel holes in the second half of the display area or B area.

On the next layer 167, the first area (over or under 166*a*) is divided into A and B and the second area (over or under 166*b*) is also divided into A and B sections. The layer is thus divided into four quarters, with the A conductive traces wired together and the B conductive traces wired together (connections not shown). At the next level 168, each section is further divided into an A and B section, and again all A traces at this level are wired together and all B traces at this level are wired together (connections not shown).

At the conductive trace level 170 the sections are again divided, now with 16 different rows of traces, again dividing the sections of the layer immediately above/below each into A and B sections. A further division is shown at the next layer 172. In this schematic illustration the layer 172 is shown divided down to the individual pixels, but in practice there will be many times the 32 rows illustrated, requiring several more layers. The required number of layers can be reduced by the use of higher order encoding division on some layers, such as quaternary, octal or 16-lead division. This encoding has the additional advantage of reducing the capacitance per division. This is desirable to insure the required drive current is within low cost driver capability.

Accordingly, for the five encoding row layers illustrated in FIG. 11, only two leads emerge from each layer, an A lead and a B lead. The A traces of a particular layer are connected together by conductive vias and traces at another level (not shown), in the manner described above in reference to FIG. 13, for example.

If the row traces receive a signal consisting of AAAAB, for example (for the layers 166, 168, 167, 170 and 172, respectively), this will activate the second row from the top in FIG. 11. If the signal is BABBA, this will activate the lowermost row seen in FIG. 11.

Figure 11A:
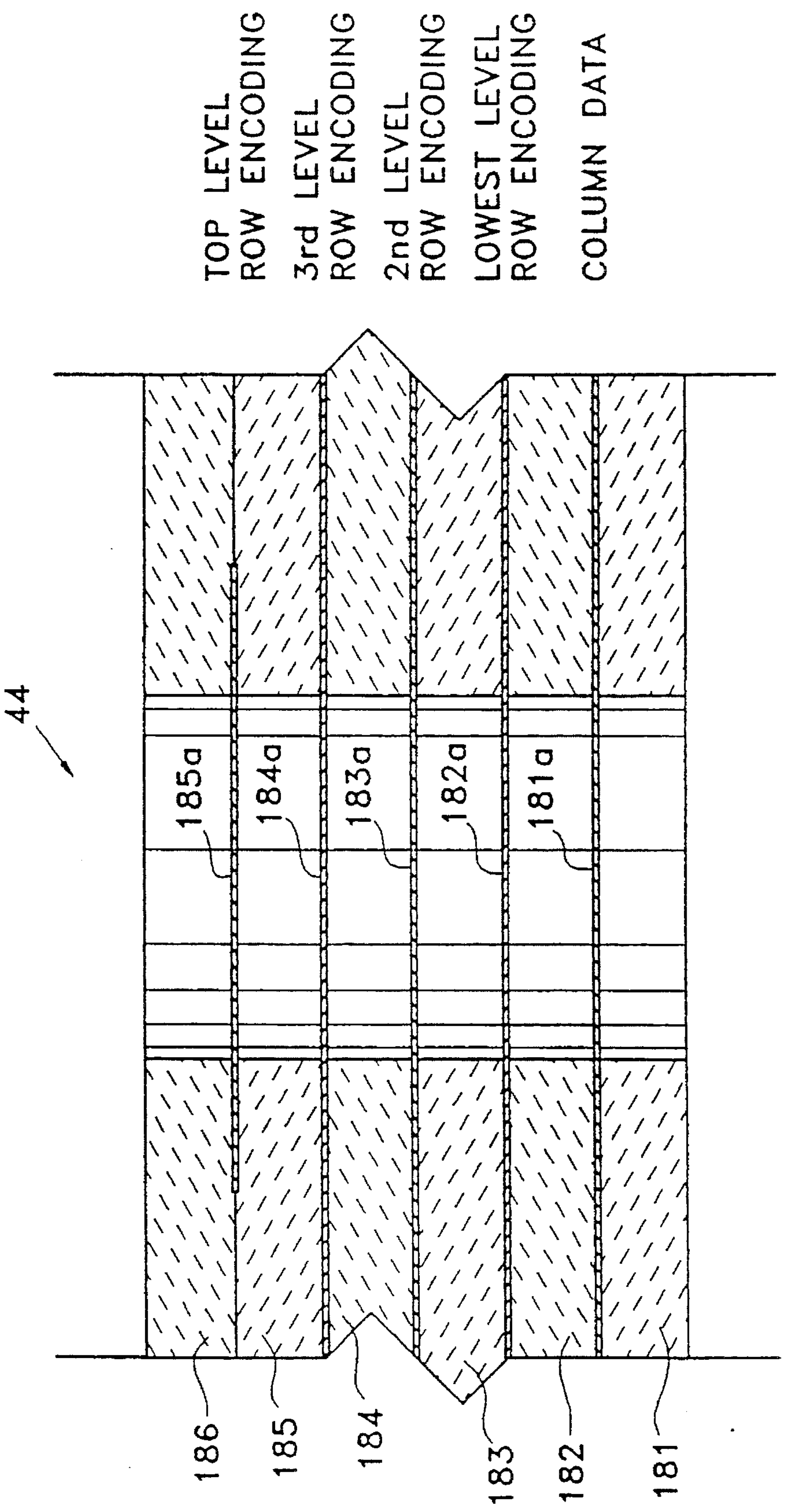
FIG. 11A is an enlarged sectional schematic view showing a single pixel hole in the addressing grid, and indicating a series of levels of conductive traces.

FIG. 11A is a schematic, greatly enlarged cross section of a portion of an addressing grid according to the invention, showing six layers 181 through 186, and the interlayer conductive traces which form rings around the pixel hole 44. In this example conductive traces 181*a*, 182*a*, 183*a*, 184*a* and 185*a* are shown only between layers, but as discussed above, the traces can be applied at either of the top and bottom surfaces of the grid assembly. The traces closest to the cathode will experience a lower cut-off voltage, the voltage necessary to repel all electrons, than will the traces closest to the anode. The power required to charge a given trace is $P=i^2R$, where i is the required current and R is the trace resistance. The required current, i, is given by CV/t, where C is the trace capacitance, V is the desired voltage and t is the time to charge the trace. For a given charge time, capacitance, and resistance, the power goes as the square of the required voltage. It is therefore important that the fastest changing signals be applied to the traces closest to the cathode where the required voltage is lowest and the necessary power is thus minimized. The lowest conductive traces 181*a* can be for column data, as in the traces 174 of the monochrome example of FIG. 11. The next four layers above can carry four levels of row encoding, i.e. at the traces 182*a*, 183*a*, 184*a* and 185*a*. The encoding which requires the fastest switching should be done at the lowest voltage as indicated above. Thus, if binary encoding is used (as in FIG. 11), the top level row encoding, at the traces 185*a*, should have the fewest traces (e.g. only two as in FIG. 11). It should be understood that grey code techniques (which are well known) can be used to further reduce the power required in switching the addressing grid. Grey code techniques reduce the number of layers of conductive traces which must be changed in transitioning from one row to another.

The power usage in driving the traces within the grid comes from charging traces up to the required voltage, not from discharging the traces. Grey code minimizes the number of transitions in encoding levels, thereby minimizing the required power. Grey codes are no more difficult to mechanically encode in the multilayer ceramic than any other encoding scheme, such as the discussed binary encoding, octal encoding, etc.

In order to minimize the required switching voltage at the layer closest to the anode, conductive traces or a sheet-like conductive layer can be placed on the top surface of the upper layer 186, or this conductive layer can be below the top surface (traces not shown in FIG. 11A). Such a conductive layer, located as the closest conductive layer to the anode, shields the switching region from electric fields produced by the anode voltage. This also will further modify the field lines inside the addressing holes 44, to reduce the voltage necessary to turn on and off the gate. This is important in that, in some configurations, a relatively high switching voltage is required to switch the last element of the addressing hole gate, i.e. the uppermost conductive trace 185*a* shown in FIG. 11A.

At the cathode side of the addressing grid 44, there may also be conductive traces or a conductive layer, in order to help accelerate electrons through the grid. This layer improves the extraction of electrons from the cathode and aids in making the electron flow more uniform. Such a cathode-side layer on the grid (not shown in FIG. 11A) acts as a sink for power, but it can improve the performance of the cathode ray tube by providing a higher density of electrons to the back side of the grid.

Figure 11B:
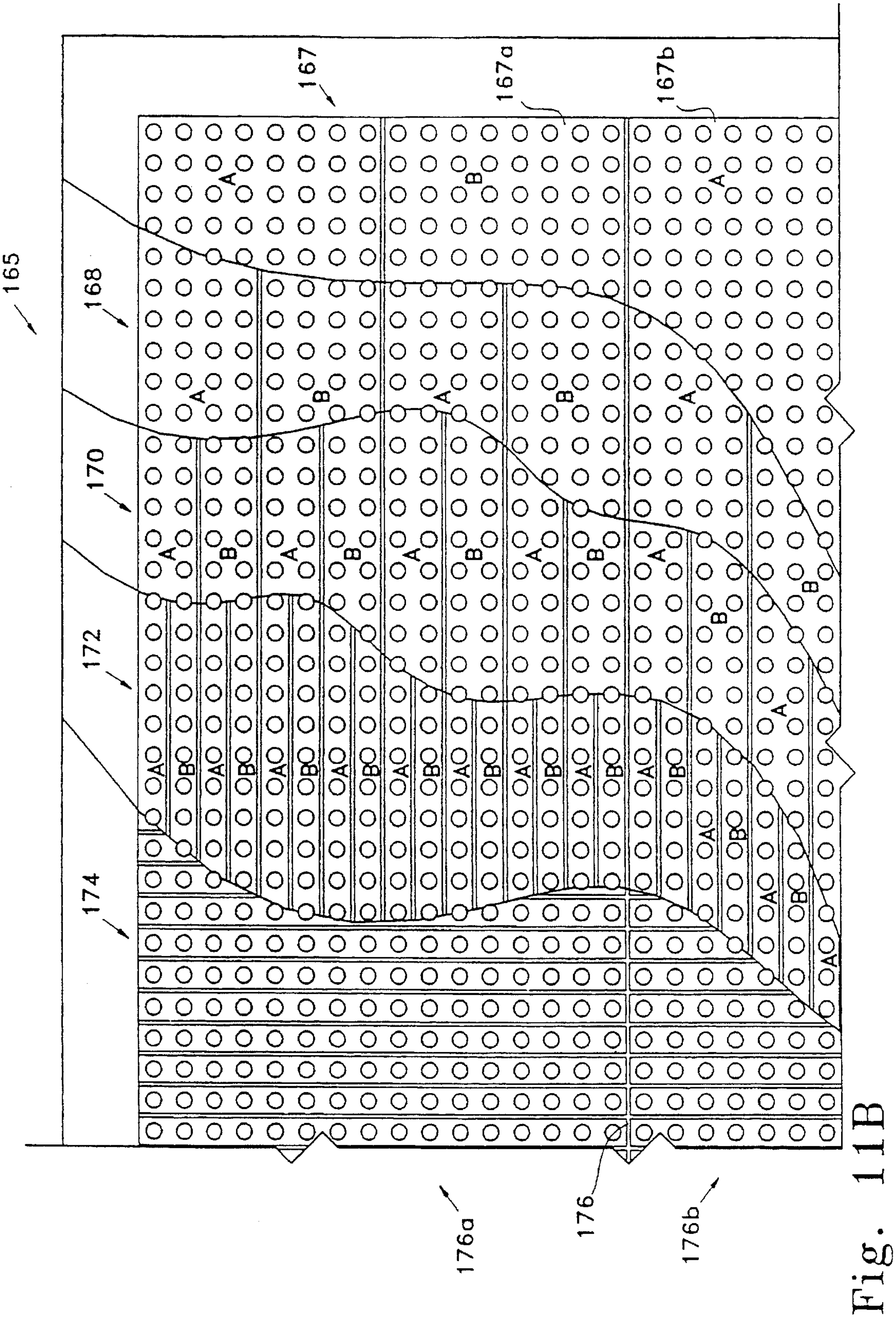
FIG. 11B is a view similar to FIG. 11, showing an alternative embodiment by which brightness of the display can be doubled.

FIG. 11B shows an alternative embodiment of an encoded grid structure 165*a* by which brightness of the display can be doubled through activating two rows of pixels at a time. For simplicity the display is shown as monochrome, with the addressing holes in simple orthogonal rows and columns, but it should be understood that this arrangement is particularly advantageous in a color display, where brightness is more often critical. By the arrangement shown, the addressing grid is divided in half at a horizontal dividing line 176 at which the column traces are discontinuous. The top half, 176*a*, and the bottom half, 176*b*, of each column are fed different data, simultaneously. The top row of pixels of the top half, 176*a*, is preferably activated at the same time as the top row of pixels of the lower half, 176*b*. Thus, two parallel horizontal lines are traced down the screen simultaneously, and brightness is doubled.

For row encoding in this embodiment (or an equivalent color embodiment), one fewer layer is required as compared to the embodiment described relative to FIG. 11. The layer 167 is thus the row layer with fewest traces, shown with four traces A, B, A, B in this example binary encoding embodiment. The active rows are operated simultaneously and in parallel, so that when the uppermost row of the top half is addressed by AAAA, the lower half is also addressed by AAAA. This arrangement requires an additional set of drivers for the second set of columns. As noted above, each column in a row receives different data at one time, and in the doubled-brightness embodiment, each column receives two sets of data, an upper set and a lower set.

It should be understood that this brightness-doubling arrangement can be used with other possible arrangements for increasing brightness. For example, as explained elsewhere herein, the individual colors (such as R, G and B) can be activated at the same time, rather than through time division. This also requires additional drivers, but in those specialized applications where necessary, the change in color driving can increase brightness by a factor of three. Coupled with the double row driving (which can alternatively be triple, quadruple, etc. row driving), brightness can be increased by a factor of six.

Figure 14A:
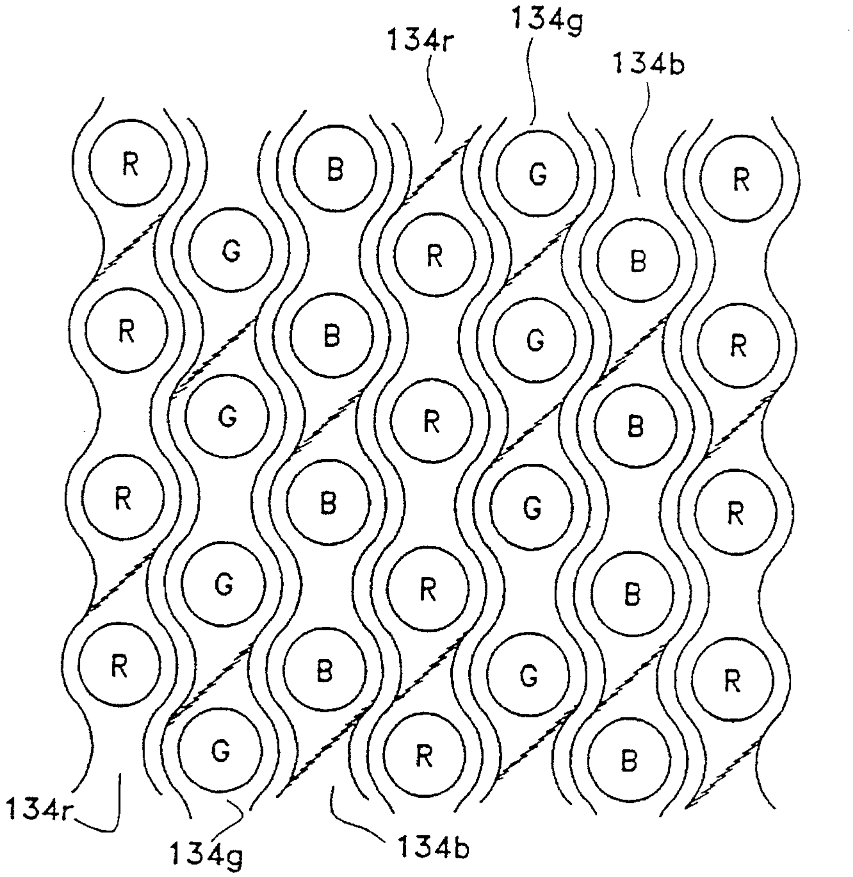
FIG. 14A is a schematic plan view illustrating the use of printing configurations to form conductive traces around addressing grid holes and illustrating problems of proximity.
Figure 14B:
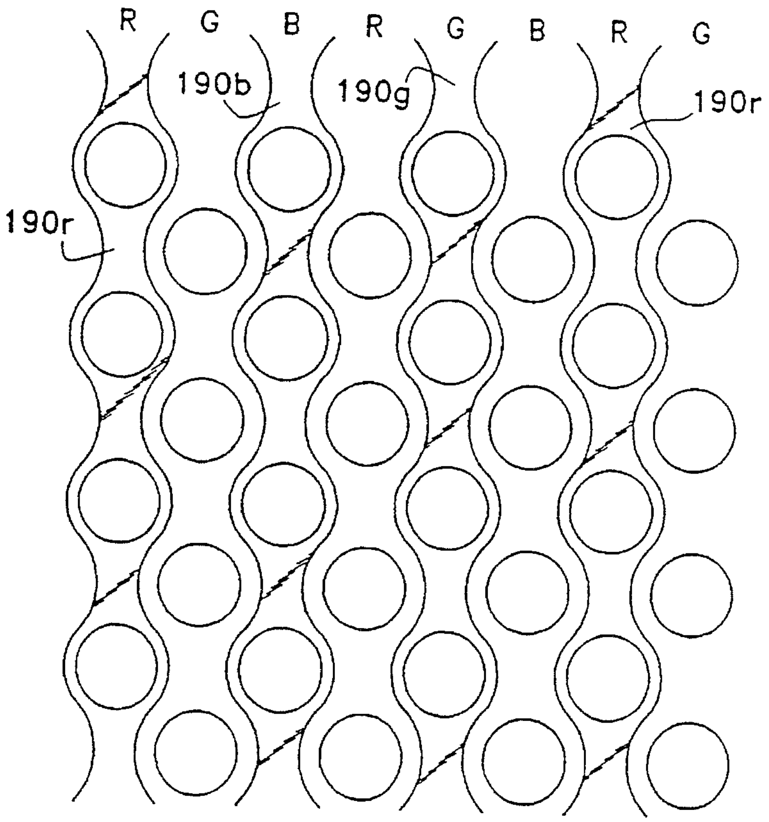
FIG. 14B is a view similar to FIG. 14A, showing an alternative arrangement for placing conductive traces, in a way to avoid problems with trace proximity by using additional layers.

FIGS. 14A and 14B show alternatives for forming conductive traces around pixel holes, depending on density required. As noted above, screen printing techniques are limited in accuracy and resolution. For high definition television displays which are relatively small in size, conductive traces 134*r,* 134*g* and 134*b* become very close together and limits may be reached as to accuracy of very fine widths of the traces and of the spaces between them. In FIG. 14A the traces are illustrated side by side, with color subcolumns R, G, B, R, G, B occurring in succession. However, an alternative made possible by the multilayer addressing grid structure of the invention is to place R traces alone on one layer (not shown). G traces and B traces (not shown) are on different layers, and, as described above, all R traces can be interconnected, as well as all G traces and all B traces. In this case the R traces can be connected directly at the same level, since no G traces or B traces will be crossed, and the case is similar with the G traces and B traces.

Another alternative, illustrated in FIG. 14*b,* is to alternate by locating every second subcolumn of conductive traces on a given layer. This will require two layers for R, G and B color selection, rather than three. Such an arrangement requires traces for all three colors to appear on each of the two layers, but the Rs are easily interconnected by conductive vias and traces, and the same with the Gs and Bs. Thus, FIG. 14*b* shows a layer with an R trace 190*r,* no trace at the adjacent G subcolumn, then a B trace 190*b*. The R subcolumn is then skipped, and next appears a G trace 190*g*. Each of two layers thus has R, G and B traces.

Figure 15A:
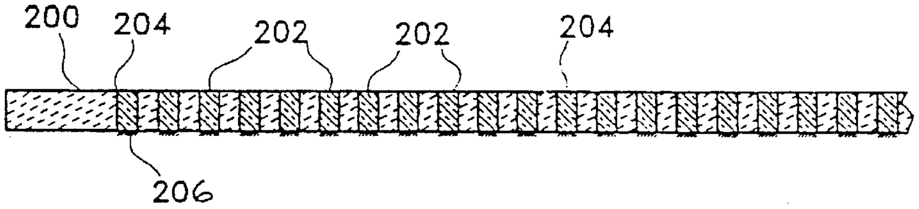
FIGS. 15A and 15B are sectional and plan views showing an alternative embodiment of the invention wherein a face plate is formed of a ceramic layer, with glass deposited in holes through the layer.
Figure 15B:
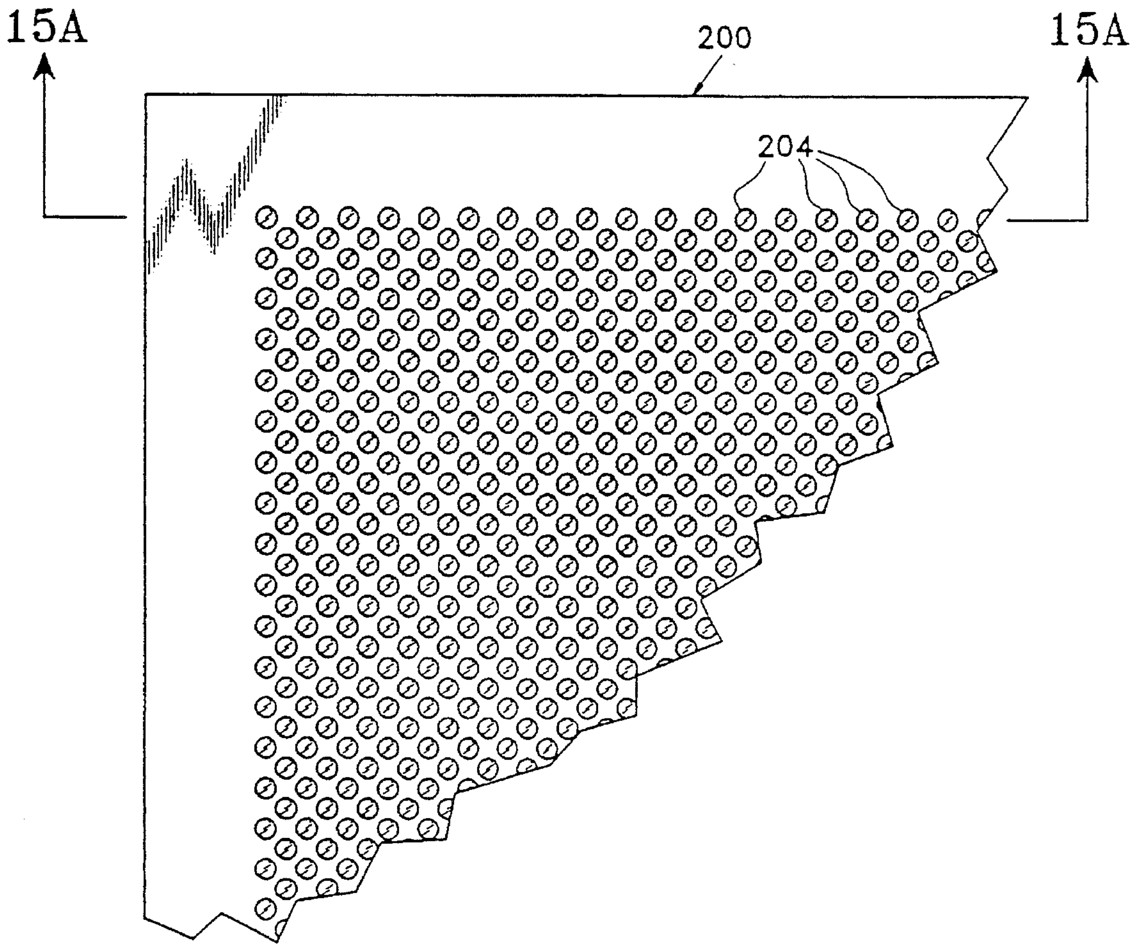

FIGS. 15A and 15B show an alternative face plate 200 to the glass face plate 12 shown in FIGS. 1, 2 and 4. The face plate 200 is not a single sheet of glass, but may comprise a ceramic layer formed of similar glass-ceramic material to the addressing grid layers described previously. The face plate 200 is formed with a multiplicity of pixel openings 202, which can be produced by the hole blowing method described above. Each of the pixel holes will be precisely in registry with one of the addressing grid holes 44 of the addressing grid structure described above. In each hole 202 is a glass filling 204, and on the inside surface of each such glass plug is deposited a dot of phosphor 206.

The glass backfilling of the holes 202 can be accomplished when the sheet of glass-ceramic material is in the green state. In particular, a sheet of unfired ceramic tape of suitable length and width for face plate 200 is initially provided. The unfired ceramic tape preferably contains a coloring agent such that it is substantially opaque when fired, enhancing contrast on the screen.

Holes 202 are then formed through the unfired sheet of ceramic tape in the pattern desired for the location of the pixel data. Instead of creating holes 202 by the hole blowing method of the invention, holes 202 can be formed by photolithography techniques, the unfired ceramic tape being translucent and photo-reactive so as to become removable by dissolving in areas where exposed to an appropriate wavelength of light. After exposing the light to locations of the unfired ceramic tape where holes 202 are to be formed, holes 202 are dissolved out with an appropriate solvent.

Holes 202 are filled with generally transparent glass to form generally transparent plugs 204 in the desired pattern. This preferably involves filling each hole 202 with a fritted glass powder material held together with a binder. The fritted glass powder material has a shrinkage characteristic matched to that of the ceramic tape so that the integrity of the bonds between the ceramic tape and glass plugs 204 is maintained on firing.

Next, the ceramic tape is cured to a hardened ceramic state by firing to an appropriate temperature. When holes 202 are filled with the fritted glass powder, the curing step entails cofiring the fritted glass powder with the ceramic tape to remove binders from the glass powder and to fuse the ceramic tape together and to glass plugs 204. After firing of the face plate, the face plate is ground flat on both sides. If there is shrinkage of the glass-ceramic material on firing, the face plate will shrink to the same degree as the addressing grid, so that the holes and glass plugs will remain in registry.

For coating of the tube side of the glass dots 204 with the appropriate phosphor (red, green or blue), the face plate can be used as its own mask for lithography. The glass filled sheet will have transparent regions and semi-transparent regions, or if the green face plate has been doped with a dark material, as is preferred the contrast ratio is improved, which helps in the self-photolithography. The need to later add black material between the phosphor dots to achieve contrast is eliminated.

One method of depositing the color pixel dots on the glass plugs of the face plate, is to first deposit a photo-tacky material on the anode side of the face plate, i.e. the side which will receive the phosphor. Using three different masks, one for each color (if a three-color system such as RGB is used), light is passed through the face plate from the outer side to expose and active the photo-tacky material only at the location of the dots for the specific color. At this point, only the dots of the specific color (such as red) are tacky at the phosphor side. The red phosphor is applied to the entire back surface of the face plate in powder form, and this phosphor powder will adhere only to the red glass plugs which have been made tacky. This process is repeated for the other two colors in succession, and in each case, the entire back surface of the face plate may be dusted with the color phosphor powder, since only the dots of interest will be tacky at that time. After all three colors have been adhered to the glass plugs at appropriate locations, the face plate is cured by burning off the "photo-tacky" material, leaving the phosphor dots on the back of the face plate, each limited to a specific area of the dot.

Once the phosphor dots 206 have been printed onto the tube side of the glass plugs in the face plate, the entire tube side surface can be metallized or aluminized, or an interconnected series of spots over the phosphor dots can be connected by metallizing.

The advantages of the described method and structure for forming a ceramic face plate with glass plugs are the ability to use the same material as the addressing grid structure, so that thermal expansion of the face plate can be equalized to the addressing grid; the ability to build in opaqueness in the face plate, by doping the unfired ceramic material with a dark material; and the ability to punch the holes in the unfired ceramic material at the same time and in the same pattern as the holes in the addressing grid structure, so that these pixel dot holes can be precisely in registry with the addressing grid holes.

The face plate subassembly can then be laid on top of a stack of multilayer glass ceramic elements such as described above. If a cold cathode is used in the assembly, then an entire solid structure can be produced from the green glass ceramic material, with each pixel being in a sense an individual TV tube, i.e. each individual electron beam from a single cathode passes through a single hole to a single phosphor dot. Each has an anode, a cathode and a switch modulating the gate for each individual pixel.

Figure 16:
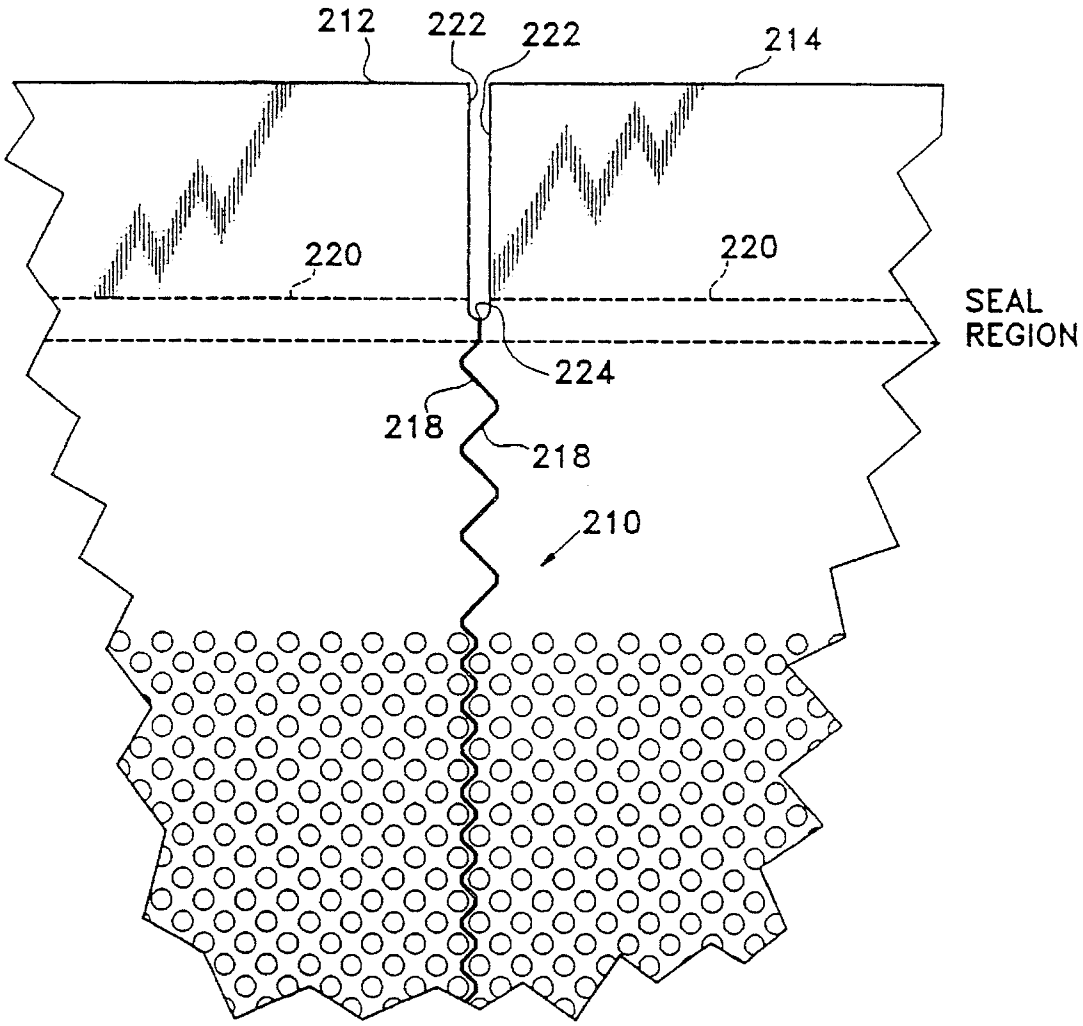
FIG. 16 is an enlarged, schematic sectional view showing a structure arrangement for assembling two modular addressing grid sections together in proper registry, and for forming a seal in a peripheral area.

FIG. 16 shows schematically, in a partial sectional view, a juncture or joint 210 between a pair of addressing grid modules 212 and 214. An overall plan view of a modularized addressing grid structure 216 formed in this way is shown in FIG. 17.

As shown in FIG. 16, the edges of each addressing grid module 212 and 214 preferably have notched or serrated areas 218, for assuring proper registry between the modules and the rows of the addressing grid upon assembly. The seal area 220, which extends around the pair of assembled modules near their periphery, is notched by a recess or notch 222, formed on each module and extending from the exterior edge to a position 224 which is within the band defined by the seal area 220. This notching provides a means for application of the glass frit sealing material not only to the upper surfaces of the modules for sealing to the anode and back plate, but also for direct application to the facing surfaces where the two modules 212 and 214 meet at the edge, within the notch (perpendicular to plane of FIG. 16). In this way a secure seal is assured between the facing surfaces.

Figure 17:
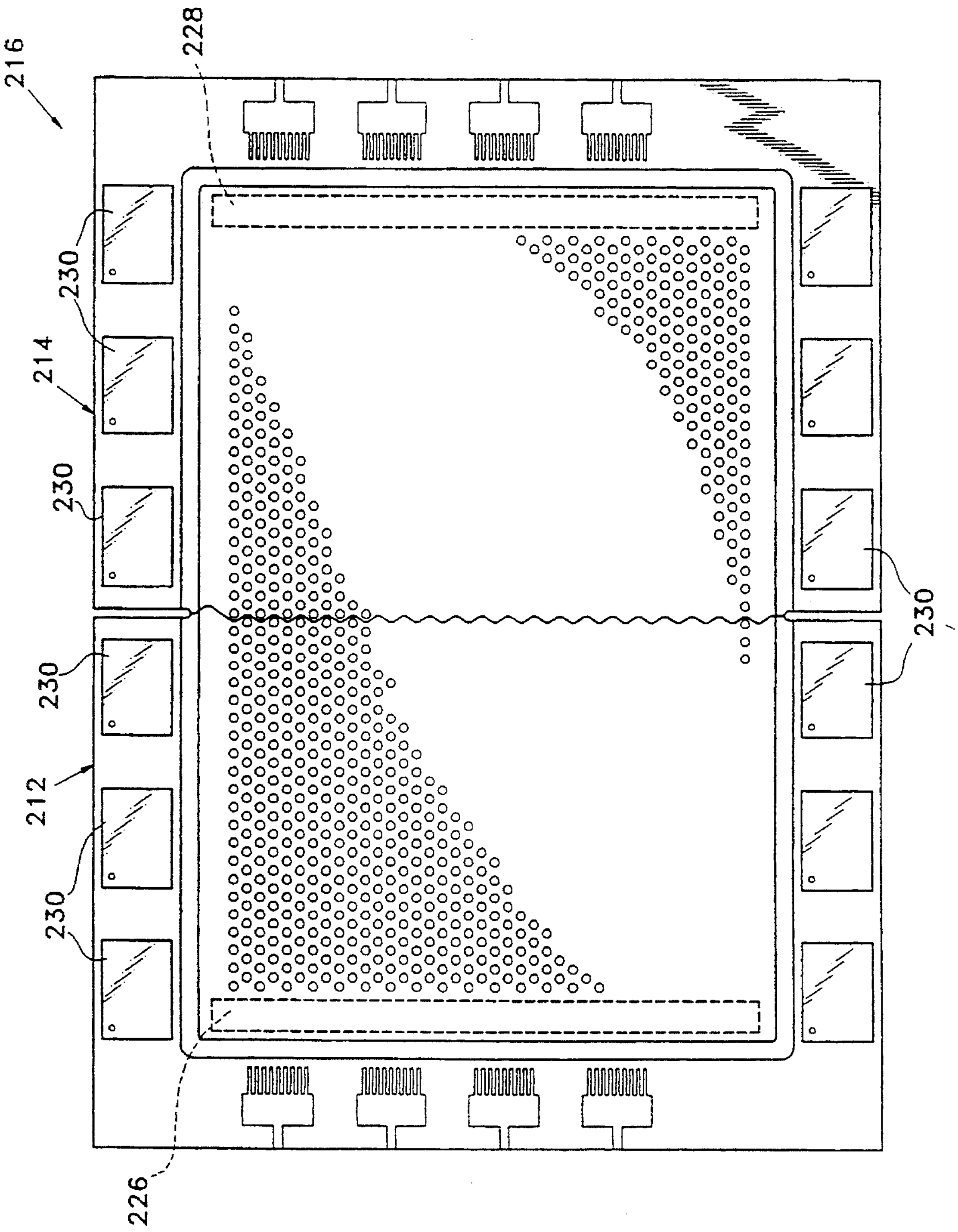
FIG. 17 is a schematic plan view showing a pair of addressing grid modules assembled together in side by side relationship, comprising a pair of end modules.

FIG. 17 shows that the two end type modules 212 and 214 still leave space for transfer areas 226 and 228 at left and right, one on each module 212 and 214. In this modular arrangement, drivers 230 handle the addressing of pixels on each respective side of the assembly, with these two sets of drivers appropriately synchronized.

It should be noted that the flexibility in design afforded by the multilayer grid allows the modules to be constructed so that no traces need to cross between the mating modules. In this way the modules need only align mechanically.

Figure 18:
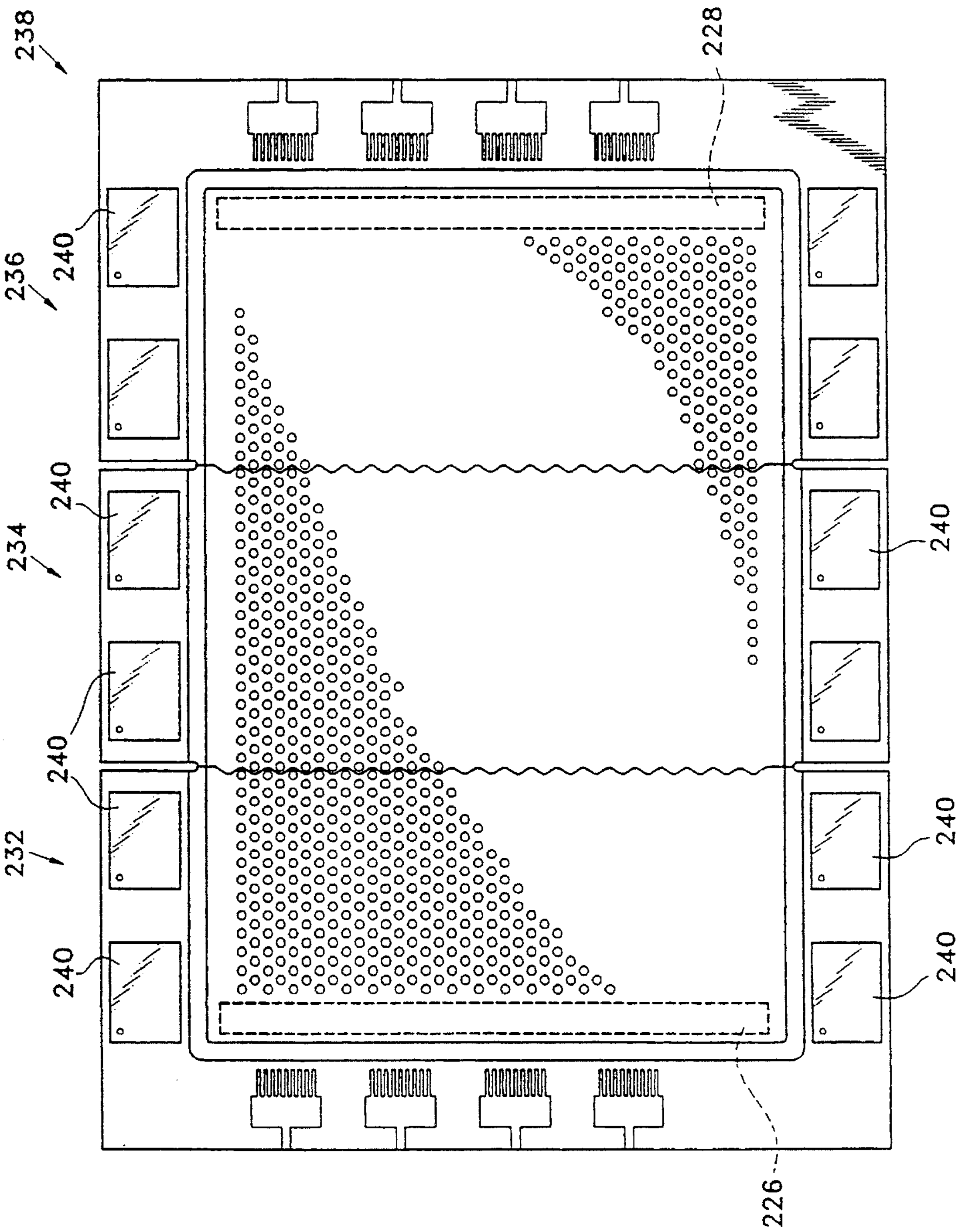
FIG. 18 is a plan view similar to FIG. 17, but showing three modules assembled together, two end modules and a center module, involving different trace routing considerations.

FIG. 18 shows a series of modules, illustrated as three modules 232, 234 and 236, making up a display 238. In this case, as in all modular assemblies with three modules or more, the center module 234 has no left and right margins for location of trace transfers to the periphery of the display assembly 238, i.e. no transfer areas similar to the areas 226 and 228 on end modules. Connections between the row traces and the drives must be made entirely on an individual module. This requires the use of conductive vias placed between the pixel holes and interconnecting traces to connect the row traces to one or more) transfer layers (discussed below with reference to FIG. 20). From the transfer layer the conductive path can be taken to drivers 240 at top and bottom of the assembly. The drivers 240 are connected with drivers on the end modules 232 and 236, for synchronized operation of the row traces, as well as of the column traces and color select traces.

The use of interpixel vias generally is only necessary for display designs where multiple modules are necessary. Those displays would typically be large displays (over 25 inch diagonal) where the interpixel spalcing is large, allowing sufficient room for such via designs. For small displays, where the space between pixels is more limited, these vias would normally not be necessary.

Figure 19:
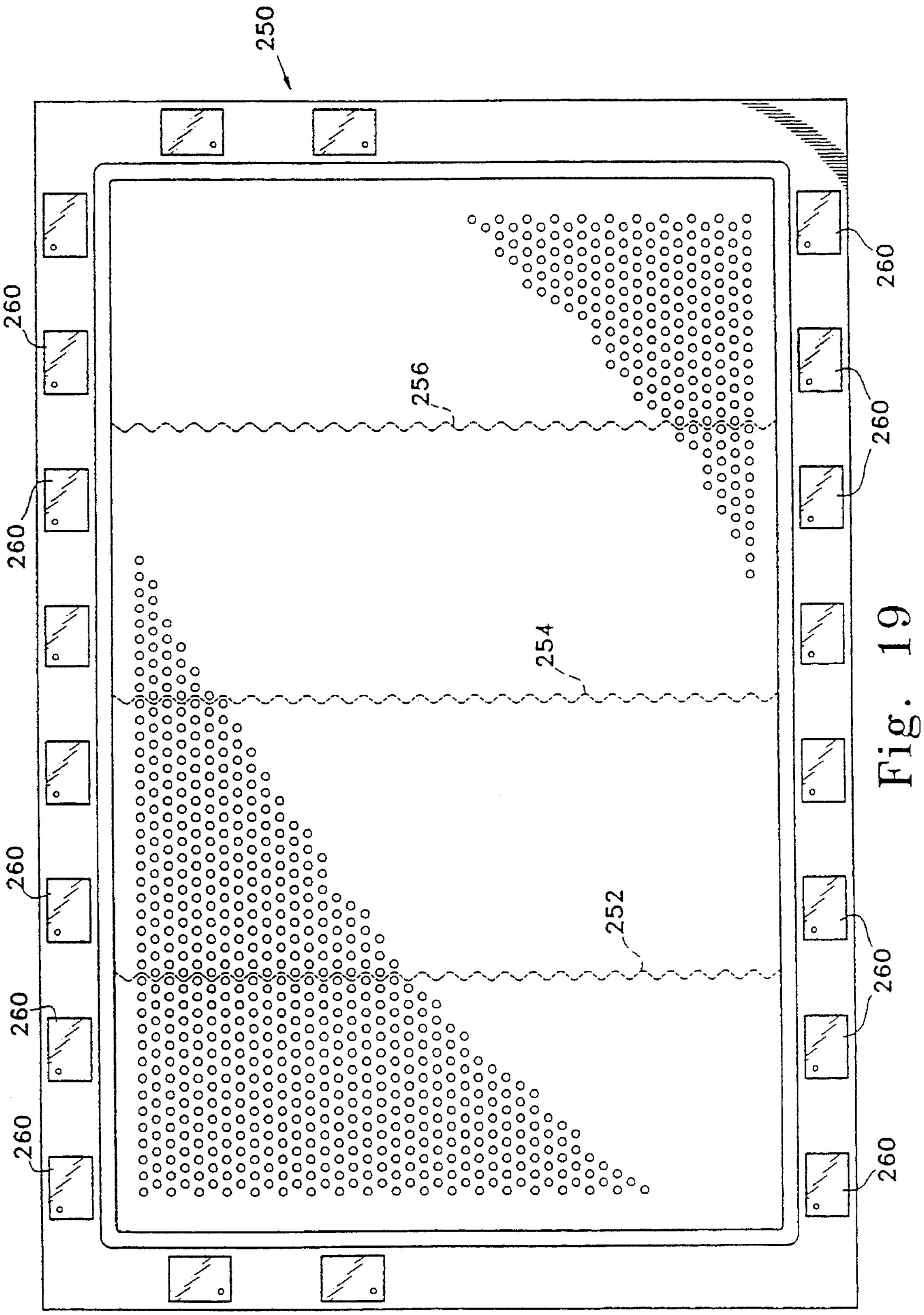
FIG. 19 is another plan view similar to FIG. 17, but showing a single module with a modularized trace printing arrangement to reduce capacitance and resistance, particularly for very large screens.

FIG. 19 is a plan view of a display assembly 250 which comprises a single module, rather than joined module sections. FIG. 19 illustrates the principle that the electronics can nonetheless be modular within the display, in the case of a very large display 250. Vertical dividing lines 252, 254 and 256 are shown in dashed lines in FIG. 19, to indicate that the horizontal traces are divided into four sections as far as driving electronics are concerned. In very long conductive traces, problems of capacitance and resistance will be encountered, adversely affecting the electron transfer and the operation of the display. A multiple printing scheme is used to divide each horizontal trace into multiple sections, such as four for the embodiment shown in FIG. 19. Each section along a trace line is driven separately, but in coordination, via connected drive electronics 260. Again, interpixel conductive vias are used to bring the trace sections down to one or more transfer layers, since no margin is available at the divisions 252, 254 and 256 for bringing the traces out to the edges.

Figure 20:
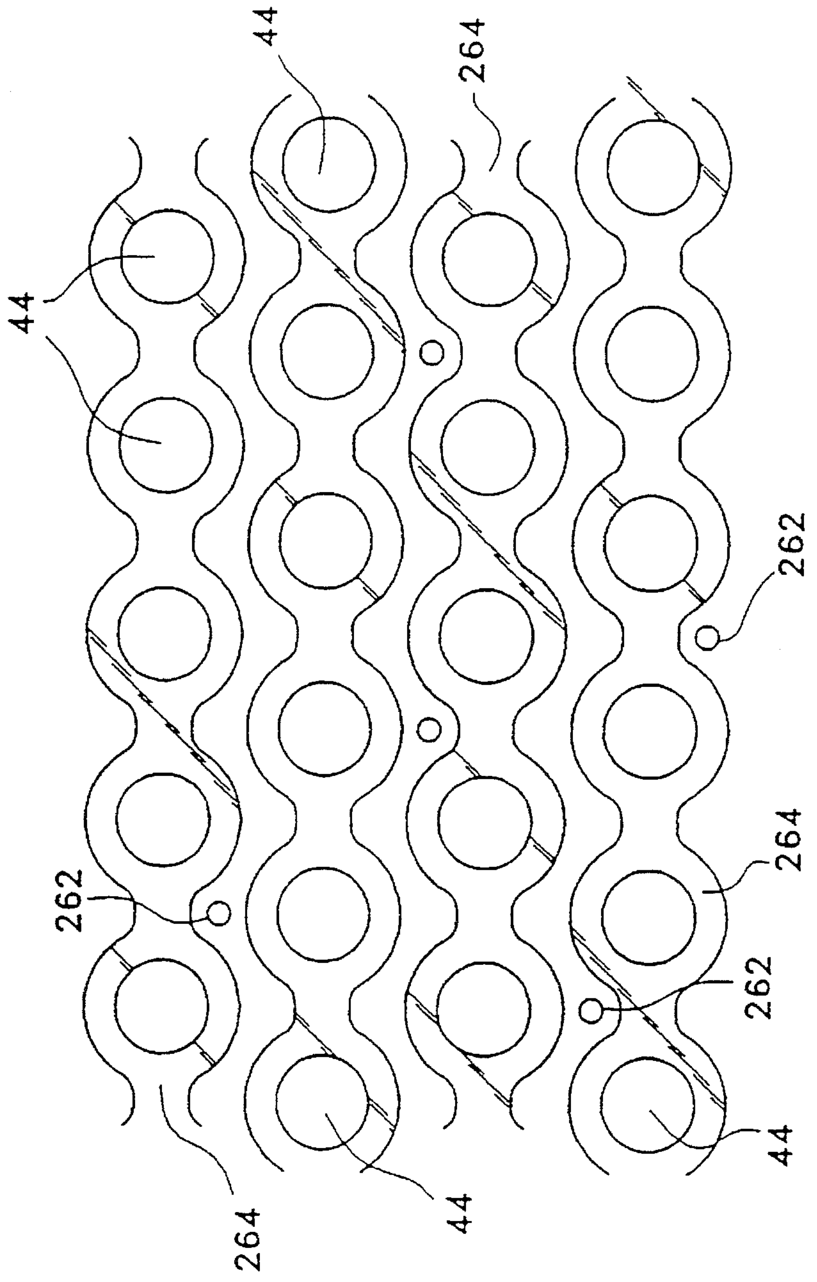
FIG. 20 is a greatly enlarged plan view showing several conductive traces around addressing holes on a layer of the addressing grid, and showing interpixel conductive vias which are used in the embodiments of FIGS. 18 and 19.

FIG. 20 is a greatly enlarged schematic view showing interpixel conductive vias 262. Conductive traces, in the form described above relative to FIGS. 14A and 14B, for example, are shown at 264. As indicated, the interpixel conductive vias 262, which may be considerably smaller than the addressing holes 44, are placed at locations where the printed conductive traces 264 can be separated a reasonable distance without losing any substantial portion of the conductive path.

Figure 21:
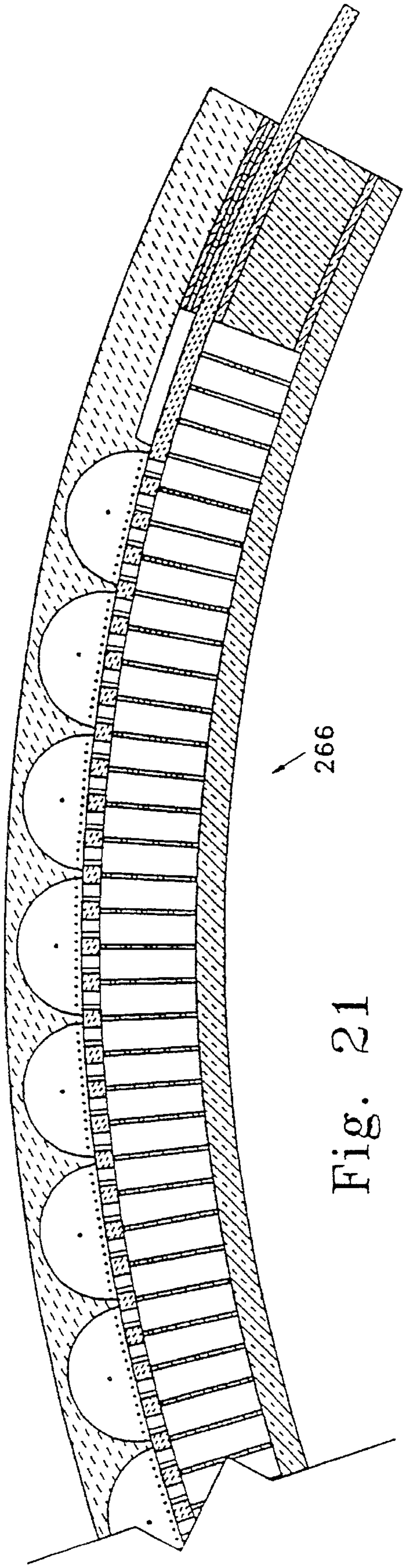
FIG. 21 is a schematic view and section, indicating a curved screen embodiment of a thin CRT in accordance with the invention.

FIG. 21 shows a portion of a curved screen embodiment of the invention. The curved, thin screen display 266 is similar in dimensions and proportions to the embodiments described above, but it is curved concavely relatively to the viewer, for specialized applications such as simulators, targeting applications for combat, or special effects for use with a very large screen. The screen display may also be curved convexly for certain display applications. The illustrated components are similar to those described earlier.

Figure 22:
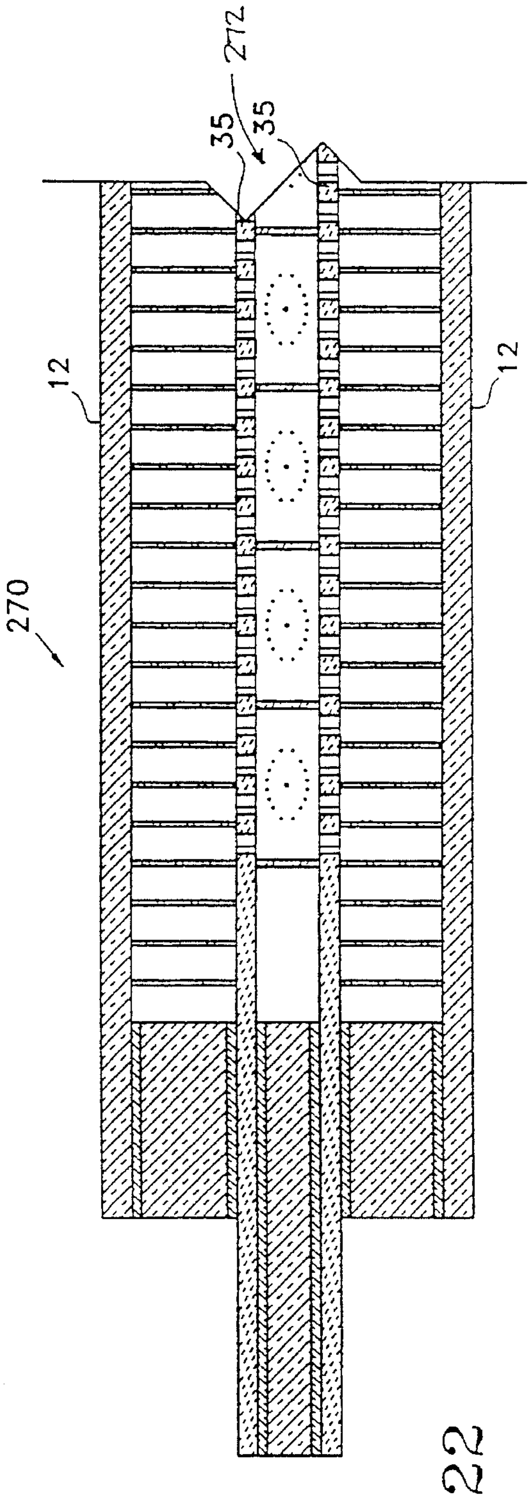
FIG. 22 is another sectional schematic view somewhat similar to FIG. 21, but showing a two-sided flat screen CRT in accordance with the invention, with a common cathode.

FIG. 22 shows another variation of the invention. A portion of a two-sided thin CRT display 270 is shown, with two separate addressing grids 35 but a common cathode 272 which supplies electrons in both directions, for each anode/faceplate 12.

It is also pointed out that the invention permits nonrectangular screen shapes and irregular screen shapes, since the CRT assembly is self-supporting and no electron gun is involved. A screen can be circular, for example, as in a radar screen, or irregular so as to fit into a vehicle dashboard or an aircraft control panel. Grids need not have addressing holes laid out on an orthogonal basis, but can be arranged by polar coordinates. In a circular screen, for example, holes can be on radial lines, with traces following radial lines and others in concentric circles.

Figure 23:
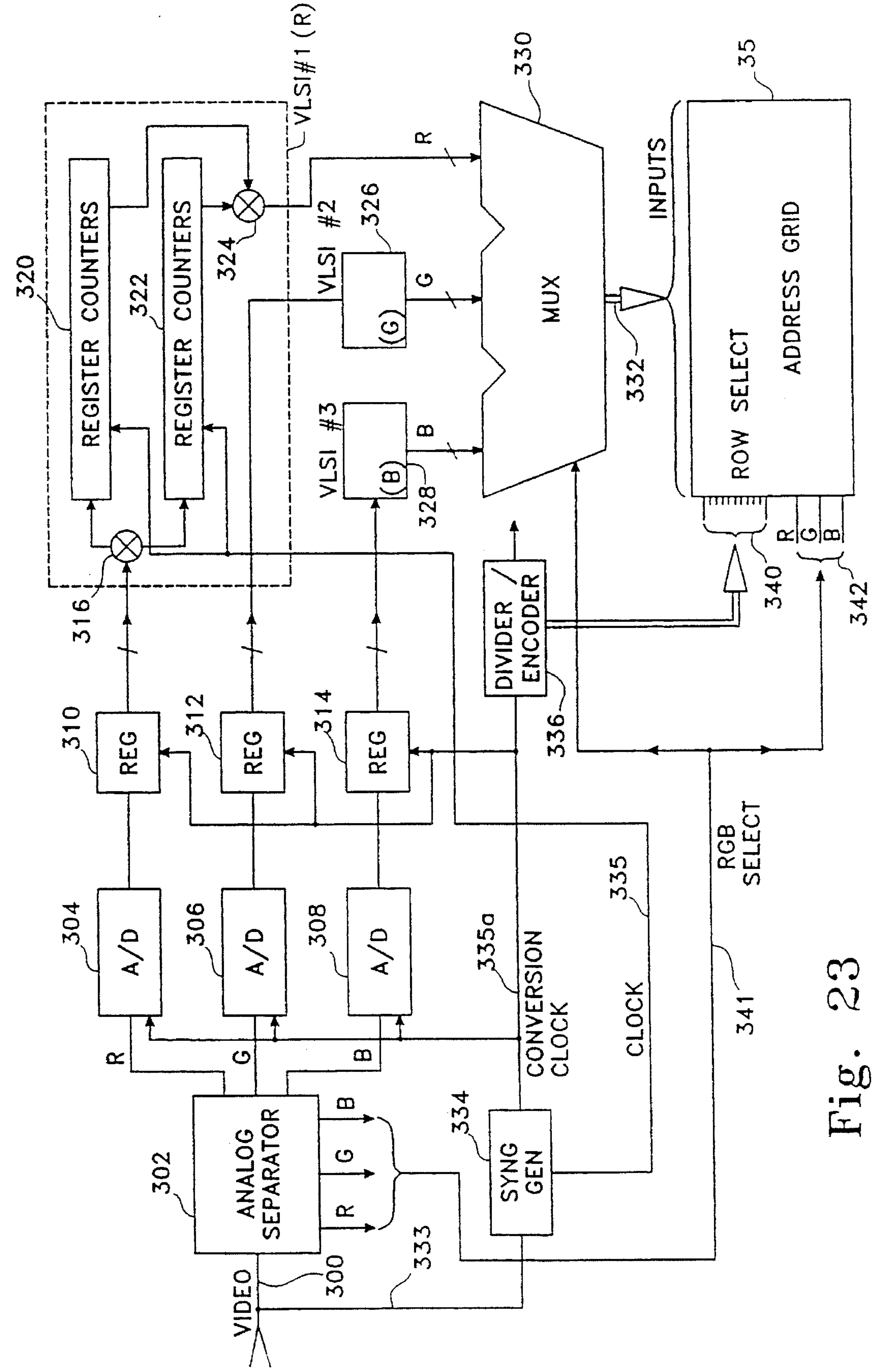
FIG. 23 is a simplified drive electronics block diagram for the system of the invention.

FIG. 23 is a block diagram schematically indicating drive electronics for a flat screen display in accordance with the invention. The video signal is shown at 300 entering the analog separator 302 where it is divided out into the red, green and blue (R, G and B) components of video signal. At this point, the red, green and blue components are digitized by analog to digital converters 304, 306 and 308 as shown. Each of the red, green and blue components of the video signal is digitized in its own A to D digitizer 304, 306 and 308.

If the video signal is a digital signal rather than an analog signal, the signal would be impressed at points to the right of the A/D converters in the drawing, without the analog separation and A/D converters being used.

The digitized video signals, red, green and blue, are passed through storage registers 310, 312 and 314. Following the red path, the signal goes through a two-way switch 316 into one of two registers 320 or 322. Two register counters are used; one is loaded while the other is being outputted to the MUX for display. The register counters are loaded in serial fashion, otherwise known as a "bucket brigade", filling from the left to the right until all column data is stored. Once the register counters are filled, they are switched through the two-way switch 324 into the multiplexer or MUX 330. This is identical to the process which is carried out for the green and the blue signals, via register counters 326 and 328. The original video signal provided a sync pulse 333 which goes through sync generator 334 and comes out as a clock signal 335 which is used to drive both the register counters for loading the digital data into the counters, and another output 335*a* of the sync generator provides signals to a divider/encoder 336. The output of the divider/encoder 336 is used to drive the row select line 340. In addition, the analog separator 302 provides output signals 341 to drive both the multiplexer 330 and the display RGB select lines 342. In this way the same synchronized selection signal coordinates the MUX's selection of either R, G or B data while simultaneously selecting the appropriate R, G or B select lines within the glass/ceramic grid. Therefore, when the MUX has been selected to transmit R data to the display columns, only the red phosphor dots in each column are active because only the red select lines have been activated.

Thus, the analog signal is separated into its component colors which pass through A/D converters to storage registers and finally are impressed one row at a time onto the columns of the display 35 while simultaneously counters have divided down the row information and impressed that on the row select and the color select data at the appropriate times.

Certain terms are used in the above description and should be interpreted broadly. The term "hole" is intended to encompass not only circular holes, but also slot-shaped holes, elliptical holes, hexagonal holes, triangular holes, or any other shape which might be appropriate for a particular application or selected arrangement of the addressing grid and the pixels. Differently shaped holes are appropriate to different types of screens and also to the number of colors selected in a color complement for a pixel. If four-color pixels are selected, square-shaped or diamond-shaped holes may be preferred.

In this regard, although red,.green, and blue colors are referred to in the above description, this is not intended to limit the invention in this aspect, and four-color pixels may alternatively be used.

Also, the term "plastic" is sometimes used herein in its technical sense of meaning workable or deformable in a nonelastic way.

The term "glass-ceramic" or "ceramic" is often used herein to refer to the family of glass, ceramic, glass-ceramic, or ceramic glass materials as described earlier. This is particularly true in reference to ceramic tapes, a term used frequently in the claims.

In the description of depositing conductive traces, screening printing is often mentioned. The reference to screen printing is intended broadly, and should be understood to include lithography, flat plate printing techniques, and other printing techniques.

Lithography can actually achieve a greater density of conductive traces since, in general, ¼ micron resolution can be achieved, far higher resolution than screen printing.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

I claim:

1. A method for producing a face plate for a cathode ray tube display, comprising:

providing a sheet of unfired ceramic tape of suitable length and width for a display, forming a multiplicity of small holes through the unfired ceramic tape, in a desired pattern for location of pixel dots, filling the holes with generally transparent glass, to form generally transparent plugs in the desired pattern, curing the ceramic tape to a hardened state by firing to an appropriate temperature, and coating each plug, at an inner, anode side of the face plate, with phosphor of appropriate color.

2. The method of claim 1, wherein the step of filling the holes comprises filling each hole with a fritted glass powder material held together with a binder, and wherein the curing step comprises cofiring the fritted glass powder with the ceramic tape, to remove binders from glass powder and to fuse the ceramic tape together and to the glass plugs.

3. The method of claim 2, wherein the unfired ceramic material contains a coloring agent such that it is substantially opaque when fired, enhancing contrast on the screen.

4. The method of claim 2, wherein the fritted glass powder material has a shrinkage characteristic matched to that of the ceramic tape, so that the integrity of the bonds between the ceramic tape and the glass plugs is maintained on firing.

5. The method of claim 1, wherein the holes in the unfired ceramic tape are formed by photolithography techniques, the unfired ceramic tape being translucent and photo-reactive so as to become removable by dissolving in areas where exposed to an appropriate wavelength of light, and including the steps of exposing the light onto locations of the unfired ceramic tape where the holes are to be formed, then dissolving out the holes with an appropriate solvent.

* * * * *